US012706721B2

(12) United States Patent
Mao et al.

(10) Patent No.: US 12,706,721 B2
(45) Date of Patent: Aug. 11, 2026

(54) APPARATUS, SYSTEM, AND METHOD OF WIRELESS COMMUNICATION BASED ON A NETWORK CODING (NC) SCHEME

(71) Applicant: INTEL CORPORATION, Santa Clara, CA (US)

(72) Inventors: Wei Mao, San Jose, CA (US); Minyoung Park, San Ramon, CA (US); Hosein Nikopour, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/958,341

(22) Filed: Oct. 1, 2022

(65) Prior Publication Data

US 2023/0036520 A1 Feb. 2, 2023

(51) Int. Cl.
*H04L 5/00* (2006.01)
*H04L 1/00* (2006.01)

(52) U.S. Cl.
CPC .......... *H04L 5/0055* (2013.01); *H04L 1/0009* (2013.01); *H04L 5/0048* (2013.01)

(58) Field of Classification Search
CPC ... H04L 5/0055; H04L 1/0009; H04L 5/0048; H04L 1/1671; H04L 1/1614; H04L 1/0041
See application file for complete search history.

(56) References Cited

U.S. PATENT DOCUMENTS 6,621,851 B1 * 9/2003 Agee ........................ H04L 5/026 370/242
7,225,382 B2 * 5/2007 Ramech ................ H04L 1/0068 714/748

(Continued)

FOREIGN PATENT DOCUMENTS

CN 101998438 A * 3/2011
CN 102223674 A * 10/2011

(Continued)

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

(Continued)

*Primary Examiner* — Michael A Keller
(74) *Attorney, Agent, or Firm* — Shichrur & Co.

(57) ABSTRACT

In one example, a wireless communication device may be configured to encode k data packets into n encoded packets according to a Network Coding (NC) scheme, wherein k is equal to or greater than two, and wherein n is greater than k; and to determine a count of x encoded packets out of the n encoded packets, for example, based on a count of m required packets. For example, a value of m may be based on a difference between k and a total count of successfully received encoded packets, which are successfully received by the receiver device. For example, the wireless communication device may be configured to transmit the x encoded packets over the wireless communication link.

25 Claims, 10 Drawing Sheets

(56) References Cited

U.S. PATENT DOCUMENTS 7,408,938 B1 * 8/2008 Chou .................... H04L 1/0076 370/473
7,502,317 B2 * 3/2009 Joshi ....................... H04L 47/50 370/395.42
7,760,728 B2 * 7/2010 Chou ..................... H04H 20/42 370/473
7,773,506 B2 * 8/2010 Agashe ............. H04W 28/0252 370/395.2
7,876,677 B2 * 1/2011 Cheshire ................. H04L 47/50 370/230.1
8,279,781 B2 * 10/2012 Lucani .................. H04L 1/1671 370/461
8,780,693 B2 * 7/2014 Kim ...................... H04W 40/00 370/231
8,914,713 B2 * 12/2014 Vyetrenko ............. H04L 1/0061 714/821
9,025,607 B2 * 5/2015 Zeger .................... H04L 1/0077 370/400
9,137,492 B2 * 9/2015 Lima .............. H04N 21/234327
9,143,274 B2 * 9/2015 Zeger .................... H04L 1/0075
9,160,687 B2 * 10/2015 Haeupler .............. H04L 49/901
9,294,113 B2 * 3/2016 Feizi-Khankandi ........................ H03M 1/1265
9,300,602 B2 * 3/2016 Sampath ............... H04L 1/1819
9,369,255 B2 * 6/2016 Medard ................. H04L 1/1854
9,369,541 B2 * 6/2016 Medard ................... H04L 67/06
9,537,759 B2 * 1/2017 Calmon .................. H04L 45/24
9,607,003 B2 * 3/2017 Medard .......... H04N 21/234327
9,992,088 B1 * 6/2018 Ho ...................... H04L 43/0835
10,311,243 B2 * 6/2019 Calmon .................. H04L 9/065
10,530,574 B2 * 1/2020 Shi ........................ H04L 9/0819
11,418,449 B2 * 8/2022 Fouli ..................... H04L 1/0041
11,424,861 B2 * 8/2022 Fouli ..................... H04L 1/0041
11,463,372 B2 * 10/2022 Calmon ................ H04W 76/15
11,489,761 B2 * 11/2022 Calmon .................. H04L 69/14
12,261,949 B2 * 3/2025 Medard ................. H04L 9/3215
2003/0214951 A1 * 11/2003 Joshi ....................... H04W 8/04 370/395.42
2005/0078653 A1 * 4/2005 Agashe ............... H04L 47/2475 370/349
2005/0251721 A1 * 11/2005 Ramesh ................ H04L 1/1819 714/748
2006/0274691 A1 * 12/2006 Naguib ................. H04L 1/1819 370/349
2007/0116027 A1 * 5/2007 Ciavaglia ........... H04Q 11/0066 370/395.42
2009/0175320 A1 * 7/2009 Haustein ............... H04L 1/0631 375/219
2010/0046371 A1 * 2/2010 Sundararajan ........ H04L 1/1635 370/235
2010/0054164 A1 * 3/2010 Lucani .................. H04L 1/0041 370/468
2012/0106575 A1 * 5/2012 Oh .................... H03M 13/6527 370/474
2014/0029630 A1 * 1/2014 Go ...................... H04L 49/9057 370/474
2014/0036657 A1 * 2/2014 Suter ..................... H04L 1/0076 370/216
2021/0120478 A1 4/2021 Akl et al.
2021/0127296 A1 4/2021 Akl et al.
2023/0031225 A1 2/2023 Perez-Ramirez et al.
2023/0035698 A1 2/2023 Park et al.

FOREIGN PATENT DOCUMENTS

CN 102291226 B * 7/2013
CN 105007541 A * 10/2015 ..... H04N 21/234327
CN 114666831 B * 11/2024 ......... H04L 43/0888
EP 1780924 A1 * 5/2007 ........... H04L 1/0631
EP 2582083 A2 * 4/2013 ............... H04L 1/18
EP 4 195 547 6/2023
KR 101448634 B1 * 10/2014 ........... H04L 1/0007
WO 2011/071472 6/2011
WO WO-2013030811 A1 * 3/2013 ........... H04L 1/1838
WO 2021/237398 12/2021
WO WO-2023196102 A1 * 10/2023 ............ H04L 69/14

OTHER PUBLICATIONS

Search Report for European Patent Application No. 22198026.1, mailed on Apr. 25, 2023, 8 pages.

Chen Li et al., "Promenade: Proportionally Fair Multipath Rate Control in Datacenter Networks with Random Network Coding", IEEE Transactions on Parallel and Distributed Systems, USA, vol. 30, No. 11, Nov. 1, 2019, pp. 2536-2546, XP011749890.

Daniel Behnke et al., "ScalaNC—Scalable heterogeneous link aggregation enabled by Network Coding", 2017 IEEE 13th International Conference on Wireless and Mobile Computing, Networking and Communications (WIMOB), IEEE, Oct. 9, 2017, pp. 241-248, XP033261443.

* cited by examiner

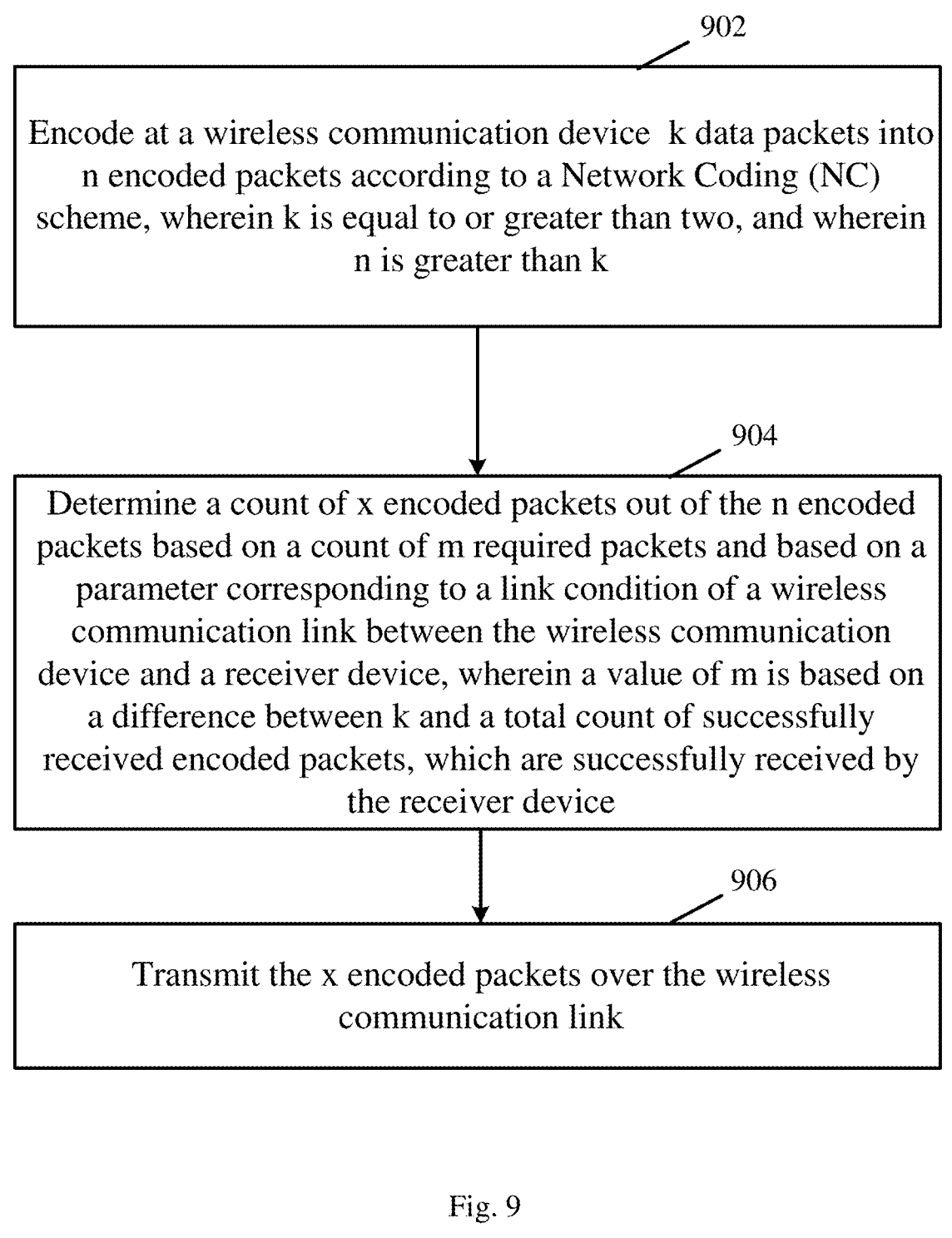

902

Encode at a wireless communication device k data packets into n encoded packets according to a Network Coding (NC) scheme, wherein k is equal to or greater than two, and wherein n is greater than k

904

Determine a count of x encoded packets out of the n encoded packets based on a count of m required packets and based on a parameter corresponding to a link condition of a wireless communication link between the wireless communication device and a receiver device, wherein a value of m is based on a difference between k and a total count of successfully received encoded packets, which are successfully received by the receiver device

906

Transmit the x encoded packets over the wireless communication link

Fig. 9

APPARATUS, SYSTEM, AND METHOD OF WIRELESS COMMUNICATION BASED ON A NETWORK CODING (NC) SCHEME

TECHNICAL FIELD

Aspects described herein generally relate to wireless communication based on a Network Coding (NC) scheme.

BACKGROUND

Some wireless communication networks may provide high-throughput data for users of wireless communication devices.

There is a need for technical solutions to provide increased and/or efficient access to the wireless communication medium.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 9 is a schematic flow-chart illustration of a method of wireless communication based on an NC scheme, in accordance with some demonstrative aspects.

DETAILED DESCRIPTION

Figure 1:
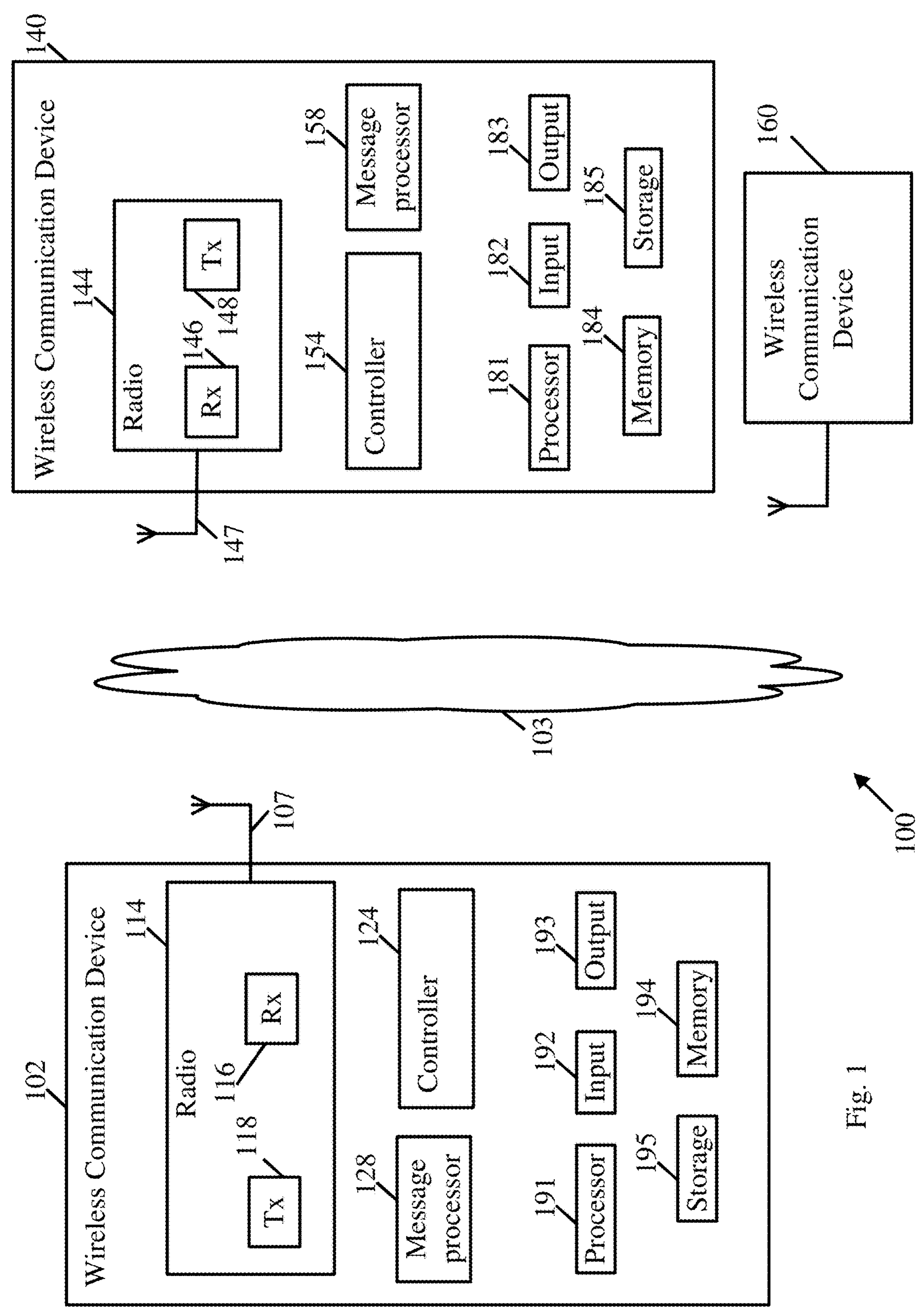
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (*IEEE* 802.11-2020*, IEEE Standard for Information Technology—Telecommunications and Information Exchange between Systems Local and Metropolitan Area Networks—Specific Requirements; Part* 11*: Wireless LAN Medium Access Control* (*MAC*) *and Physical Layer* (*PHY*) *Specifications, December,* 2020); and/or IEEE 802.11be (*IEEE P*802.11*be*/D2.0 *Draft Standard for Information technology— Telecommunications and information exchange between systems Local and metropolitan area networks— Specific requirements; Part* 11*: Wireless LAN Medium Access Control* (*MAC*) *and Physical Layer* (*PHY*) *Specifications; Amend-*

*ment 8: Enhancements for extremely high throughput (EHT), May* 2022)) and/or future versions and/or derivatives thereof, devices and/or networks operating in accordance with existing cellular specifications and/or protocols, and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, some functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency band below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects may be implemented by an Extremely High Throughput (EHT) STA, which may include for example, a STA having a radio transmitter, which is capable of operating on a channel that is in frequency bands between 1 GHz and 7.250 Ghz. The EHT STA may perform other additional or alternative functionality. Other aspects may be implemented by any other apparatus, device and/or station.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, a wireless communication device 160, and/or one more other devices.

In some demonstrative aspects, devices 102, 140, and/or 160 may include a mobile device or a non-mobile, e.g., a static, device.

For example, devices 102, 140, and/or 160 may include, for example, a UE, an MD, a STA, an AP, a Smartphone, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a video source, an audio source, a video sink, an audio sink, a stereo tuner, a broadcast radio receiver, a digital audio player, a speaker, an audio receiver, an audio amplifier, a gaming device, a data source, a data sink, a media player, a television, a music player, a smart device such as, for example, lamps, climate control, car components, household components, appliances, and the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an OS of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a disk drive, a solid-state drive (SSD), and/or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102, 140, and/or 160 may be capable of communicating content, data, information and/or signals via a wireless medium (WM) 103. In some demonstrative aspects, wireless medium 103 may include, for example, a radio channel, a cellular channel, an RF channel, a Wi-Fi channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, one or more channels in a 2.4 GHz wireless communication frequency band, one or more channels in a 5 GHz wireless communication frequency band, and/or one or more channels in a 6 GHz wireless communication frequency band. For example, WM 103 may additionally or alternatively include one or more channels in a mmWave wireless communication frequency band. In other aspects, WM 103 may include any other type of channel over any other frequency band.

In some demonstrative aspects, device 102, device 140, and/or device 160 may include one or more radios including circuitry and/or logic to perform wireless communication between devices 102, 140, 160, and/or one or more other wireless communication devices. For example, device 102 may include at least one radio 114, and/or device 140 may include at least one radio 144.

In some demonstrative aspects, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative aspects, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative aspects, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, a mmWave band, and/or any other band, for example, a 5G band, an S1G band, and/or any other band.

In some demonstrative aspects, radios 114 and/or 144 may include, or may be associated with one or more, e.g., a plurality of, antennas.

In some demonstrative aspects, device 102 may include one or more, e.g., a single antenna or a plurality of, antennas 107, and/or device 140 may include on or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a single antenna, a plurality of antennas, a phased array antenna, a multiple element antenna, a set of switched beam antennas, and/or the like. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, antennas 107 and/or antennas 147 may be connected to, and/or associated with, one or more Radio Frequency (RF) chains.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other aspects, controller 124, message processor 128 and/or radio 114 may be implemented by one or more additional or alternative elements of device 102.

In some demonstrative aspects, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other aspects, controller 154, message processor 158 and/or radio 144 may be implemented by one or more additional or alternative elements of device 140.

In some demonstrative aspects, device 102, device 140, and/or device 160 may include, operate as, perform the role of, and/or perform one or more functionalities of, one or more STAs. For example, device 102 may include at least one STA, device 140 may include at least one STA, and/or device 160 may include at least one STA.

In some demonstrative aspects, device 102, device 140, and/or device 160 may include, operate as, perform the role of, and/or perform one or more functionalities of, one or more EHT STAs. For example, device 102 may include, operate as, perform the role of, and/or perform one or more functionalities of, at least one EHT STA; device 140 may include, operate as, perform the role of, and/or perform one or more functionalities of, at least one EHT STA; and/or device 160 may include, operate as, perform the role of, and/or perform one or more functionalities of, at least one EHT STA.

In other aspects, devices 102, 140 and/or 160 may include, operate as, perform the role of, and/or perform one or more functionalities of, any other wireless device and/or station, e.g., a WLAN STA, a Wi-Fi STA, and the like.

In some demonstrative aspects, device 102, device 140, and/or device 160 may be configured operate as, perform the role of, and/or perform one or more functionalities of, an access point (AP), e.g., an EHT AP, or any other AP.

In some demonstrative aspects, device 102, device 140, and/or device 160 may be configured to operate as, perform the role of, and/or perform one or more functionalities of, a non-AP STA, e.g., an EHT non-AP STA, pr any other non-AP STA.

In other aspects, device 102, device 140, and/or device 160 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative aspects devices 102, 140 and/or 160 may be configured to communicate over an EHT network, and/or any other network. For example, devices 102, 140 and/or 160 may perform Multiple-Input-Multiple-Output (MIMO) communication, for example, for communicating over the EHT networks, e.g., over an EHT frequency band, e.g., in frequency bands between 1 GHz and 7.250 GHz.

In some demonstrative aspects, devices 102, 140 and/or 160 may be configured to operate in accordance with one or more Specifications, for example, including one or more IEEE 802.11 Specifications, e.g., an IEEE 802.11-2020 Specification, an IEEE 802.11be Specification, and/or any other specification and/or protocol.

In some demonstrative aspects, devices 102, 140 and/or 160 may be configured according to one or more standards, for example, in accordance with an IEEE 802.11be Standard, which may be configured, for example, to enhance the efficiency and/or performance of an IEEE 802.11 Specification, which may be configured to provide Wi-Fi connectivity.

Some demonstrative aspects may enable, for example, to significantly increase the data throughput defined in the IEEE 802.11-2020 Specification, for example, up to a throughput of 30 Giga bits per second (Gbps), or to any other throughput, which may, for example, satisfy growing demand in network capacity for new coming applications.

Some demonstrative aspects may be implemented, for example, to support increasing a transmission data rate, for example, by applying MIMO and/or Orthogonal Frequency Division Multiple Access (OFDMA) techniques.

In some demonstrative aspects, devices 102, 140 and/or 160 may be configured to communicate MIMO communications and/or OFDMA communication in frequency bands between 1 GHz and 7.250 GHz.

In some demonstrative aspects, device 102, device 140 and/or device 160 may be configured to support one or more mechanisms and/or features, for example, OFDMA, Single User (SU) MIMO, and/or Multi-User (MU) MIMO, for example, in accordance with an IEEE 802.11be Standard and/or any other standard and/or protocol.

In some demonstrative aspects, device 102, device 140 and/or device 160 may include, operate as, perform a role of, and/or perform the functionality of, one or more EHT STAs. For example, device 102 may include, operate as, perform a role of, and/or perform the functionality of, at least one EHT STA, device 140 may include, operate as, perform a role of, and/or perform the functionality of, at least one EHT STA, and/or device 160 may include, operate as, perform a role of, and/or perform the functionality of, at least one EHT STA.

In some demonstrative aspects, devices 102, 140 and/or 160 may implement a communication scheme, which may include Physical layer (PHY) and/or Media Access Control (MAC) layer schemes, for example, to support one or more applications, and/or increased throughput, e.g., throughputs up to 30 Gbps, or any other throughput.

In some demonstrative aspects, the PHY and/or MAC layer schemes may be configured to support OFDMA techniques, SU MIMO techniques, and/or MU MIMO techniques.

In some demonstrative aspects, devices 102, 140 and/or 160 may be configured to implement one or more mechanisms, which may be configured to enable SU and/or MU communication of Downlink (DL) and/or Uplink frames (UL) using a MIMO scheme.

In some demonstrative aspects, device 102, device 140 and/or device 160 may be configured to implement one or more MU communication mechanisms. For example, devices 102, 140 and/or 160 may be configured to implement one or more MU mechanisms, which may be configured to enable MU communication of DL frames using a MIMO scheme, for example, between a device, e.g., device 102, and a plurality of devices, e.g., including device 140, device 160, and/or one or more other devices.

In some demonstrative aspects, devices 102, 140, and/or 160 may be configured to communicate over an EHT network, and/or any other network and/or any other frequency band. For example, devices 102, 140, and/or 160 may be configured to communicate DL transmissions and/or UL transmissions, for example, for communicating over the EHT networks.

In some demonstrative aspects, devices 102, 140 and/or 160 may be configured to communicate over a channel bandwidth, e.g., of at least 20 Megahertz (MHz), in frequency bands between 1 GHz and 7.250 GHz.

In some demonstrative aspects, devices 102, 140 and/or 160 may be configured to implement one or more mechanisms, which may, for example, support communication over a wide channel bandwidth (BW) ("channel width") (also referred to as a "wide channel" or "wide BW") covering two or more channels, e.g., two or more 20 MHz channels, e.g., as described below.

In some demonstrative aspects, wide channel mechanisms may include, for example, a mechanism and/or an operation whereby two or more channels, e.g., 20 MHz channels, can be combined, aggregated or bonded, e.g., for a higher bandwidth of packet transmission, for example, to enable achieving higher throughputs, e.g., when compared to transmissions over a single channel. Some demonstrative aspects are described herein with respect to communication over a channel BW including two or more 20 MHz channels, however other aspects may be implemented with respect to communications over a channel bandwidth, e.g., a "wide" channel, including or formed by any other number of two or more channels, for example, a bonded or aggregated channel including a bonding or an aggregation of two or more channels.

In some demonstrative aspects, device 102, device 140 and/or device 160 may be configured to communicate one or more transmissions over one or more channel BWs, for example, including a channel BW of 20 MHz, a channel BW of 40 MHz, a channel BW of 80 MHz, a channel BW of 160 MHz, a channel BW of 320 MHz, and/or any other additional or alternative channel BW, e.g., as described below.

In some demonstrative aspects, devices 102, 140 and/or 160 may be configured to generate, process, transmit and/or receive a Physical Layer (PHY) Protocol Data Unit (PPDU) having a PPDU format (also referred to as “EHT PPDU format”), which may be configured, for example, for communication between EHT stations, e.g., as described below.

In some demonstrative aspects, a PPDU, e.g., an EHT PPDU, may include at least one non-EHT field, e.g., a legacy field, which may be identified, decodable, and/or processed by one or more devices (“non-EHT devices”, or “legacy devices”), which may not support one or more features and/or mechanisms (“non-legacy” mechanisms or “non-EHT mechanisms”). For example, the legacy devices may include non-EHT stations and/or non-High Throughput (HT) stations, which may be, for example, configured according to an IEEE 802.11-2020 Standard, and the like.

Figure 2:
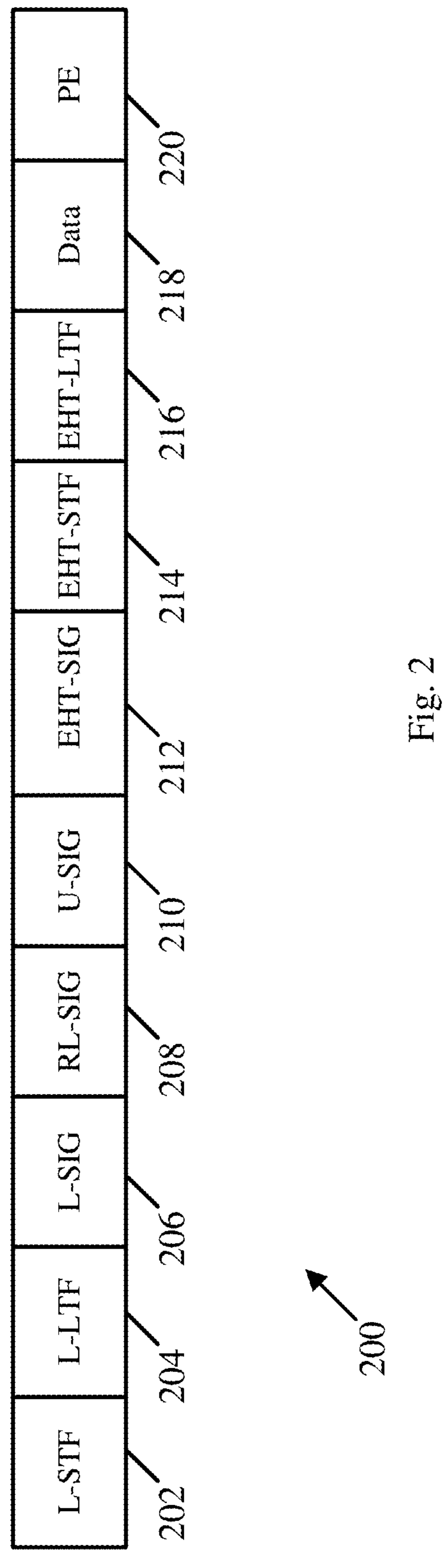
FIG. 2 is a schematic illustration of an Extremely High Throughput (EHT) Physical layer (PHY) Protocol Data Unit (PPDU) format, which may be implemented in accordance with some demonstrative aspects.

Reference is made to FIG. 2, which schematically illustrates an EHT PPDU format 200, which may be implemented in accordance with some demonstrative aspects. In one example, devices 102 (FIG. 1), 140 (FIG. 1), and/or 160 (FIG. 1) may be configured to generate, transmit, receive and/or process one or more EHT PPDUs having the structure and/or format of EHT PPDU 200.

In one example, devices 102 (FIG. 1), 140 (FIG. 1), and/or 160 (FIG. 1) may communicate EHT PPDU 200, for example, as part of a transmission over a channel, e.g., an EHT channel, having a channel bandwidth including one or more 20 MHz channels, for example, a channel BW of 20 MHz, a channel BW of 40 MHz, a channel BW of 80 MHz, a channel BW of 160 MHz, a channel BW of 320 MHz, and/or any other additional or alternative channel BW, e.g., as described below.

In some demonstrative aspects, EHT PPDU 200 may include an EHT SU PPDU, which may be utilized for transmission from an EHT STA, e.g., an EHT STA implemented by device 102 (FIG. 1), to one another STA, e.g., an EHT STA implemented by device 140 (FIG. 1).

In some demonstrative aspects, EHT PPDU 200 may include an EHT MU PPDU, which may be utilized for transmission from an EHT STA, e.g., an EHT STA implemented by device 102 (FIG. 1), to one or more users, for example, one or more EHT STAs, including an EHT STA implemented by device 140 (FIG. 1) and/or an EHT STA implemented by device 140 (FIG. 1).

In some demonstrative aspects, as shown in FIG. 2, EHT PPDU 200 may include a non-High Throughput (non-HT) (legacy) Short Training Field (STF) (L-STF) 202, followed by a non-HT (Legacy) Long Training Field (LTF) (L-LTF) 204, which may be followed by a non-HT Signal (SIG) (L-SIG) field 206.

In some demonstrative aspects, as shown in FIG. 2, EHT PPDU 200 may include a repeated non-HT SIG (RL-SIG) field 208, which may follow the L-SIG field 206. The RL-SIG field 208 may be followed by a Universal SIG (U-SIG) field 210.

In some demonstrative aspects, as shown in FIG. 2, EHT PPDU 200 may include a plurality of EHT-modulated fields, e.g., following the U-SIG field 210.

In some demonstrative aspects, as shown in FIG. 2, the EHT modulated fields may include, for example, an EHT Signal (EHT-SIG) field 212.

In some demonstrative aspects, as shown in FIG. 2, the EHT modulated fields may include, for example, an EHT STF (EHT-STF) field 214, e.g., following the EHT-SIG field 212.

In some demonstrative aspects, as shown in FIG. 2, the EHT modulated fields may include, for example, an EHT LTF (EHT-LTF) field 216, e.g., following the EHT-STF field 214.

In some demonstrative aspects, as shown in FIG. 2, the EHT modulated fields may include, for example, a data field 218, e.g., following the EHT-LTF field 216, and/or a Packet Extension (PE) field 220, e.g., following the data field 218.

In some demonstrative aspects, EHT PPDU 200 may include some or all of the fields shown in FIG. 2 and/or one or more other additional or alternative fields.

Referring back to FIG. 1, in some demonstrative aspects, devices 102, 140, and/or 160 may be configured to generate, transmit, receive and/or process one or more transmissions, e.g., including one or more EHT PPDUs, e.g., as described below.

In some demonstrative aspects, for example, devices 102, 140, and/or 160 may be configured to perform one or more operations, and/or functionalities of an EHT STA, which may be configured, for example, to generate, transmit, receive and/or process one or more transmissions, e.g., including one or more EHT PPDUs, e.g., including one or more fields according to the EHT PPDU format of FIG. 2.

In some demonstrative aspects, devices 102, 140, and/or 160 may be configured to generate, transmit, receive and/or process an EHT PPDU, e.g., in accordance with an IEEE 802.11be Specification and/or any other specification, e.g., as described below.

In some demonstrative aspects, for example, devices 102, 140, and/or 160 may be configured to perform one or more operations, and/or functionalities of an EHT STA, which may be configured, for example, to generate, transmit, receive and/or process the EHT PPDU as an EHT MU PPDU, for example, in accordance with the EHT PPDU formal 200 (FIG. 2).

In some demonstrative aspects, the EHT MU PPDU may include a PPDU that carries one or more PHY service data units (PSDUs) for one or more STAs using a downlink multi-user multiple input, multiple output (DL-MU-MIMO) technique, an orthogonal frequency division multiple access (DL OFDMA) technique, or a combination of the two techniques.

In some demonstrative aspects, for example, devices 102, 140 and/or 160 may be configured to perform one or more operations, and/or functionalities of an EHT STA, which may be configured, for example, to generate, transmit, receive and/or process the EHT MU PPDU, for example, over a 20 MHz channel width, a 40 MHz channel width, a 80 MHz channel width, a 160 MHz channel width, and/or a 320 Mhz channel width.

In other aspects, any other additional or alternative channel width may be utilized.

In some demonstrative aspects, devices 102, 140 and/or 160 may be configured to implement a low-latency wireless communication mechanism, which may be configured to provide a technical solution to support low-latency transmissions, e.g., very-low latency or ultra-low latency transmissions, in a wireless communication network, for example, a Wi-Fi network, e.g., as described below.

In some demonstrative aspects, the low-latency wireless communication mechanism may be configured to provide a technical solution to support emerging time-sensitive wireless communications, e.g., as described below.

In some demonstrative aspects, devices 102, 140 and/or 160 may be configured to implement a low-latency wireless communication mechanism, which may be configured to provide a technical solution to support an efficient way to deliver a packet with very high reliability and/or with low latency, e.g., as described below.

In some demonstrative aspects, there may be a need to provide a technical solution to support wireless communication of packets with a high level of reliability and/or a low latency.

In one example, a PHY may be implemented to use a low Modulation and Coding Scheme (MCS), e.g., to achieve a lower a Packet Error Rate (PER). However, in many use cases and/or scenarios packet losses may be inevitable, for example, due to interferences caused by transmissions between other access points (APs) and/or stations (STAs) in the same frequency band at the same time.

In another example, reliability may be improved by implementing retransmissions techniques, for example, with respect to a packet that is dropped. However, in many use cases and/or scenarios a large number of retransmissions may be required to reach a high reliability level, and, accordingly, the latency may increase significantly.

In another example, a selective retransmission scheme may be implemented to selectively retransmit packets based on feedback from a receiver. For example, an Aggregated MAC PDU (A-MPDU) frame structure may be implemented to communicate an A-MPDU frame including multiple subframes carrying a plurality of data packets. For example, a receiver may transmit a Block Acknowledgement (BlockAck) including a bitmap field indicating successful reception of each subframe. For example, the BlockAck may be separated from the A-MPDU by a gap time, e.g., for Tx/Rx transition. However, the selective retransmission scheme may be inefficient as a size of the BlockAck may grow linearly with the number of packets. The selective retransmission scheme may be inefficient in terms of spectral use, e.g., due to the overhead introduced by the BlockAck bitmap.

In another example, duplication techniques may be implemented to improve reliability. For example, a packet may be repeated in the transmission within same frame or Transmission Opportunity (TxOP). However, these duplication techniques may significantly lower spectral efficiency. For example, it may be required to transmit six duplicated packets, for example, for a PER of 0.1 and a target reliability of $10^{-6}$. This large number of duplicate transmissions may result in a low effective data rate, e.g., by a factor of ×6.

In some demonstrative aspects, vices 102, 140 and/or 160 may be configured to communicate wireless transmissions according to a wireless communication technique, which may be configured to provide a technical solution to successfully deliver k packets, e.g., equal-sized data packets, to a receiver over a Wi-Fi link, e.g., while using a reduced amount, e.g., a minimal amount, of radio resources, e.g., as described below.

In some demonstrative aspects, the wireless communication technique may utilize the A-MPDU structure, e.g., to support saving protocol overhead for transmission of multiple subframes, as described below.

In some demonstrative aspects, the transmitted packets may be subject to random losses. Accordingly, extra redundancy may be implemented to guarantee the success of data delivery. This redundancy may be implemented in the form of reactive redundancy, e.g., retransmission, and/or proactive redundancy, e.g., coding.

In some demonstrative aspects, the wireless communication technique may utilize network coding, e.g., as an efficient form of proactive redundancy, which may be supplemented with one or more, e.g., necessary, retransmissions, e.g., as a form of reactive redundancy. For example, in opposed to some retransmission schemes, the wireless communication technique may be configured to send new encoded packets in a "retransmission", e.g., each retransmission, for example, to avoid duplicated reception, in case a BlockAck does not use a bitmap to identify which packets are lost, e.g., as described below.

In some demonstrative aspects, devices 102, 140 and/or 160 may be configured to communicate wireless transmissions based on a Network Coding (NC) scheme, e.g., as described below.

In some demonstrative aspects, the NC coding scheme may include a linear packet-level coding scheme, e.g., as described below. In other aspects, any other NC scheme may be implemented.

In some demonstrative aspects, devices 102, 140 and/or 160 may be configured to communicate wireless transmissions based on the NC scheme, for example, to provide a technical solution to support low-latency and/or high-reliability data traffic, e.g., as described below.

In some demonstrative aspects, the NC scheme may be configured to combine, e.g., to linearly combine, data packets, for example, to form new encoded packets having dependence among them, e.g., as described below.

In some demonstrative aspects, wireless transmissions according to the NC scheme may be implemented provide a technical solution to support recovery of the original data packets, for example, even in case only some of the encoded packets are successfully received. For example, as long as a sufficient number of encoded packets, e.g., regardless of which ones, are correctly received at the receiver, the original data packets may be recovered, for example, despite possible losses of all other encoded packets.

In some demonstrative aspects, wireless transmissions according to the NC scheme may be implemented to provide a technical solution to proactively add redundancy to the traffic and/or to significantly reduces delay, e.g., compared to retransmission schemes.

In some demonstrative aspects, wireless transmissions according to the NC scheme may be implemented to provide a technical solution, which is much more spectrally efficient, e.g., compared to the packet duplication techniques, for example, while not requiring too much additional computational complexity for encoding and decoding.

In some demonstrative aspects, devices 102, 140 and/or 160 may be configured to communicate wireless transmissions based on a hybrid scheme including a combination of the NC scheme with a retransmission technique. For example, this hybrid scheme may provide a technical solution supporting benefits of both the NC scheme and the retransmission technique. For example, proactively added redundancy at each (re)transmission may increase the chance of packet recovery for each time, thus reducing the number of retransmissions needed, and hence reducing the delay. For example, the opportunities to get acknowledgement from the receiver and to retransmit only when needed may reduce unnecessary transmissions of redundant data and/or save radio resources.

In some demonstrative aspects, devices 102, 140 and/or 160 may be configured to communicate wireless transmissions based on the NC scheme, which may be configured to encode a plurality of data packets, e.g., including k data packets, into a plurality of encoded packets, e.g., including n>k encoded packets, e.g., as described below.

Figure 3:
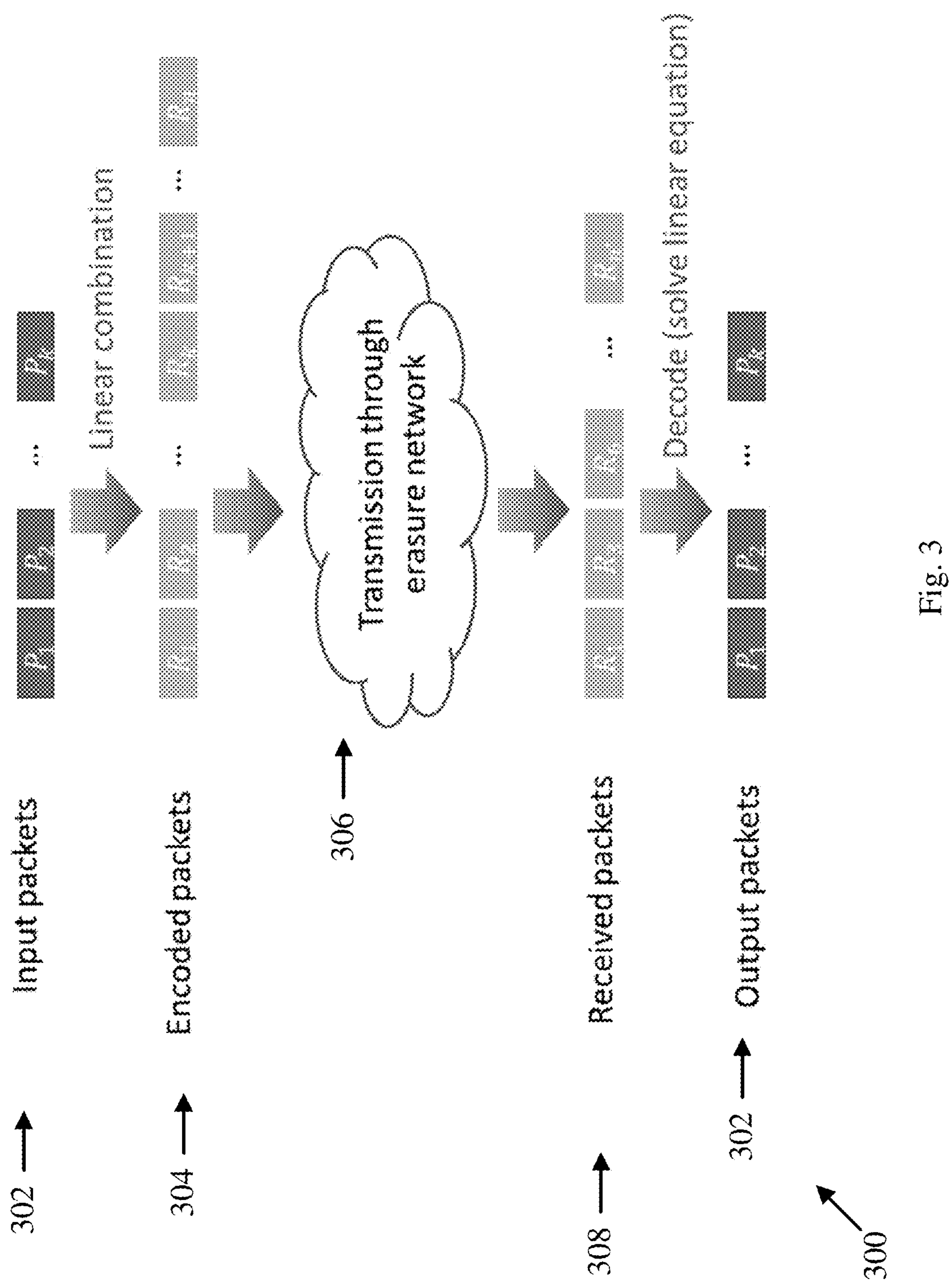
FIG. 3 is a schematic illustration of a Network Coding (NC) scheme, in accordance with some demonstrative aspects.

Reference is made to FIG. 3, which schematically illustrates an NC scheme 300, in accordance with some demonstrative aspects. For example, devices 102, 140 and/or 160 may be configured to communicate wireless transmissions based on the NC scheme 300.

For example, the NC scheme 300 may be based on a linear packet-level coding, e.g., as described below.

For example, as shown in FIG. 3, a set of n coded packets 304, denoted $[R_1, R_2, \ldots, R_n]$, may be determined by encoding a set of k packets 302, e.g., k same-sized packets, denoted $[P_1, P_2, \ldots, P_k]$, which may be viewed as column vectors over a Galois Field $\mathbb{F}$.

For example, a linearly coded packet may be constructed as $$R = \sum_{i=1}^{k} c_i \cdot P_i,$$

for example, based on an encoding vector $[c_1, c_2 \ldots, c_k]^T$, which may include coefficients chosen from the Galois Field $\mathbb{F}$.

For example, as shown in FIG. 3, the set of n coded packets 304 may be transmitted through a lossy channel/network 306, where packets may be dropped (erasure).

For example, as shown in FIG. 3, the NC scheme 300 may be configured to generate the set of n coded packets 304, for example, such that a receiver may still be able to recover the original packets $[P_1, P_2, \ldots, P_k]$, for example, even if the receiver receives only k received encoded packets 308, denoted $[R_1, R_2, \ldots, R_k]$, of the n network coded packets that are linearly independent. For example, the receiver may recover the original packets $[P_1, P_2, \ldots, P_k]$ by determining $[R_1\ R_2 \ldots R_k]M^{-1}$, wherein:

$$M = \begin{bmatrix} c_1^1 & c_1^2 & \ldots & c_1^k \\ c_2^1 & c_2^2 & \ldots & c_2^k \\ \vdots & \vdots & \ldots & \vdots \\ c_k^1 & c_k^2 & \ldots & c_k^k \end{bmatrix}$$

wherein the i-th column of the matrix M may include the encoding vector for $R_i$.

For example, the NC scheme 300 may be implemented to provide a technical solution to support an improved rate-reliability trade-off, e.g., compared to repetition techniques. For example, the improvement of the rate-reliability trade-off may increase with an increase in the coding group size (k).

For example, coding coefficients of the NC scheme 300, e.g., the coefficients $c_k$ may be chosen, for example, from codes with good performances, e.g., with a Maximum Distance Separable (MDS) property, for example, such that any choices of k encoding vectors may be linearly independent. In other aspects, any other coefficients may be implemented according to any other performance properties.

Referring back to FIG. 1, in some demonstrative aspects, controller 124 may be configured to control, trigger, cause, and/or instruct device 102 to encode a plurality of data packets, for example, a stream of data packets, e.g., including k data packets, into a plurality of encoded packets, for example, a stream of encoded packets, e.g., including n encoded packets, according to an NC scheme, e.g., as described below.

In some demonstrative aspects, the count k of packets in the plurality of data packets may be equal to or greater than two, and he count n of encoded packets in the plurality of encoded packets may be greater than k, e.g., as described below.

In some demonstrative aspects, the NC coding scheme may be configured, for example, such that the k data packets may be decodable from a group of encoded packets including at least k encoded packets of the n encoded packets.

In some demonstrative aspects, the NC coding scheme may be configured, for example, such that the k data packets may be decodable from any group of p encoded packets, wherein p is a predefined value equal to or greater than k.

In some demonstrative aspects, the NC coding scheme may be configured, for example, such that the k data packets may be decodable from any group of k encoded packets.

In some demonstrative aspects, the k data packets may include time-sensitive data packets, e.g., as described below.

In other aspects, the k data packets may include any other additional or alternative type of packets.

In some demonstrative aspects, controller 124 may be configured to control, trigger, cause, and/or instruct device 102 to determine a count of x encoded packets out of the n encoded packets, for example, based on a count of m required packets, e.g., as described below.

In some demonstrative aspects, a value of m may be based on a difference between the value of k and a total count of successfully received encoded packets, which are successfully received by a receiver device, for example, device 140 and/or device 160, e.g., as described below.

In some demonstrative aspects, controller 124 may be configured to control, trigger, cause, and/or instruct device 102 to determine a value of x, for example, based on the count of m required packets and based on at least one predefined parameter (the "NC-enhancement parameter"), which may be utilized to enhance performance of the NC scheme, e.g., as described below.

In some demonstrative aspects, controller 124 may be configured to control, trigger, cause, and/or instruct device 102 to determine a value of x, for example, based on the count of m required packets and based on a parameter corresponding to a link condition of a wireless communication link between the wireless communication device 102 and the receiver device, as described below.

In some demonstrative aspects, the parameter corresponding to the link condition may be based on a packet drop rate over the wireless communication link, e.g., as described below.

In other aspects, the parameter corresponding to the link condition may be based on any other parameter and/or attribute related to and/or affected by the link condition of the wireless communication link.

In some demonstrative aspects, controller 124 may be configured to control, trigger, cause, and/or instruct device 102 to determine the value of x, for example, based on the count of m required packets and based on a parameter corresponding to an Acknowledge (ACK) time to acknowledge successful receipt of packets at the receiver device, e.g., as described below.

In some demonstrative aspects, controller 124 may be configured to control, trigger, cause, and/or instruct device 102 to determine the value of x, for example, based on the count of m required packets and based on a feedback overhead ratio, e.g., as described below.

In some demonstrative aspects, the feedback overhead ratio may be based on a duration of an ACK from the receiver device, a gap time between the ACK and transmission of the x encoded packets, and a transmission time of an encoded packet subsequent to the ACK, e.g., as described below.

In other aspects, the feedback overhead ratio may be based on any other additional or alternative parameter.

In other aspects, controller 124 may be configured to control, trigger, cause, and/or instruct device 102 to determine a count of x encoded packets out of the n encoded packets based on one or more of the count of m required packets, the parameter corresponding to the link condition, and/or the parameter corresponding to the ACK time, alone or in combination with any other additional or alterative parameter.

In some demonstrative aspects, controller 124 may be configured to control, trigger, cause, and/or instruct device 102 to transmit the x encoded packets over the wireless communication link, for example, to device 140 and/or device 160, e.g., as described below.

In some demonstrative aspects, controller 124 may be configured to control, trigger, cause, and/or instruct device 102 to transmit an Aggregate Medium Access Control Protocol Data Unit (A-MPDU) including the x encoded packets, e.g., as described below.

In other aspects, controller 124 may be configured to control, trigger, cause, and/or instruct device 102 to transmit the x encoded packets in the form of, and/or as part of, any other type of frame and/or transmission.

In some demonstrative aspects, controller 124 may be configured to control, trigger, cause, and/or instruct device 102 to determine the value of m, for example, based on a count value in an ACK from the receiver device, which may be based on a previous transmission of encoded packets out of the n encoded packets, e.g., as described below.

In some demonstrative aspects, controller 154 may be configured to control, trigger, cause, and/or instruct device 140 to transmit the ACK to device 102 to acknowledge receipt of the previous transmission from device 102.

In some demonstrative aspects, controller 154 may be configured to control, trigger, cause, and/or instruct device 140 to configure the ACK to include a count value, which may be based, for example, on a count of encoded packets successfully received by the device 140, e.g., as described below.

In some demonstrative aspects, controller 154 may be configured to control, trigger, cause, and/or instruct device 140 to configure the count value in the ACK to include the value of m. For example, controller 154 may be configured to control, trigger, cause, and/or instruct device 140 to determine the value of m based on a difference between the value of k and a total count of successfully received encoded packets, which have been successfully received by device 140, e.g., in the previous transmission and any one or more other previous transmissions from device 102.

In some demonstrative aspects, controller 154 may be configured to control, trigger, cause, and/or instruct device 140 to configure the count value in the ACK to include a count of successfully received packets in the previous transmission, e.g., the most recent transmission received from device 102.

In some demonstrative aspects, controller 124 may be configured to control, trigger, cause, and/or instruct device 102 to perform one or more transmission iterations to transmit encoded packets, e.g., some or all of the n encoded packets, to the receiver device, e.g., as described below.

In some demonstrative aspects, controller 124 may be configured to control, trigger, cause, and/or instruct device 102 to perform an i-th transmission iteration, for example, by determining a count of x(i) encoded packets out of the n encoded packets, for example, based on a count of m(i) required packets, e.g., as described below.

In some demonstrative aspects, a value of m(i) may be based on a difference between k and a total count of successfully received encoded packets prior to the i-th iteration, e.g., as described below.

In some demonstrative aspects, controller 124 may be configured to control, trigger, cause, and/or instruct device 102 to determine a value of x(i), for example, based on a value of m(i), and based on the NC-enhancement parameter, e.g., as described below.

In some demonstrative aspects, controller 124 may be configured to control, trigger, cause, and/or instruct device 102 to determine a value of x(i), for example, based on a value of m(i), and based on the parameter corresponding to the link condition and/or the parameter corresponding to the ACK time, e.g., as described below.

In some demonstrative aspects, controller 124 may be configured to control, trigger, cause, and/or instruct device 102 to perform the i-th transmission iteration, for example, by transmitting the x(i) encoded packets over the wireless communication link, e.g., as described below.

In some demonstrative aspects, controller 124 may be configured to control, trigger, cause, and/or instruct device 102 to determine the value of m(i), for example, based on a count value in an ACK from the receiver device, which is based on an (i−1)-th transmission iteration, e.g., as described below.

In some demonstrative aspects, the count value in the ACK may include the value of m(i). For example, controller 154 may be configured to control, trigger, cause, and/or instruct device 140 to set the value of m(i) as the count value in an ACK corresponding to the (i−1)-th transmission iteration, e.g., as described above.

In some demonstrative aspects, the count value in the ACK may include a count of successfully received encoded packets in the (i−1)-th transmission iteration. For example, controller 154 may be configured to control, trigger, cause, and/or instruct device 140 to set the count value in an ACK corresponding to the (i−1)-th transmission iteration to include the count of successfully received encoded packets in the (i−1)-th transmission iteration, e.g., as described above.

In some demonstrative aspects, controller 124 may be configured to control, trigger, cause, and/or instruct device 102 to set m(1)=k, e.g., such that k encoded packets are to be transmitted in the first transmission iteration.

In other aspects, controller 124 may be configured to control, trigger, cause, and/or instruct device 102 to set m(1) to any other value, e.g., based on a value of m used in a previous transmission of previous data packets to the receiver device, and/or based on any other criteria.

In some demonstrative aspects, controller 124 may be configured to control, trigger, cause, and/or instruct device 102 to continue to perform the transmission iterations, for example, until the value of m(i) meets a predefined threshold, e.g., as described below.

In some demonstrative aspects, controller 124 may be configured to control, trigger, cause, and/or instruct device 102 to continue to perform the transmission iterations, for example, until m(i)=0, e.g., as described below.

In other aspects, the transmission iterations may be performed until on any other additional or alternative criteria is met.

In some demonstrative aspects, controller 124 may be configured to control, trigger, cause, and/or instruct device 102 to calculate a value of x, for example, based on a predefined cost function, e.g., as described below.

In some demonstrative aspects, the cost function may be applied to the value of m and the NC-enhancement parameter, for example, the parameter corresponding to the link condition and/or the parameter corresponding to the ACK time, e.g., as described below.

In some demonstrative aspects, controller 124 may be configured to control, trigger, cause, and/or instruct device 102 to retrieve the value of x from a plurality of pre-stored values of x, e.g., as described below.

In some demonstrative aspects, a plurality of predefined values of x may be stored in a local memory of device 102, e.g., memory 194, and controller 124 may be configured to retrieve the value of x from the plurality of predefined values of x, for example, the value of m and the NC-enhancement parameter, e.g., the parameter corresponding to the link condition and/or the parameter corresponding to the ACK time.

In some demonstrative aspects, the plurality of predefined values of x may be stored in a predefined Look-Up-Table (LUT), e.g., in memory 194. For example, controller 124 may be configured to retrieve the value of x from the LUT, for example, based on the value of m and the NC-enhancement parameter, e.g., the parameter corresponding to the link condition and/or the parameter corresponding to the ACK time.

In some demonstrative aspects, controller 124 may be configured to control, trigger, cause, and/or instruct device 102 to retrieve the value of x from a remote storage, e.g., from a remote database and/or service, which may be accessed via wireless communication medium 103.

Figure 4:
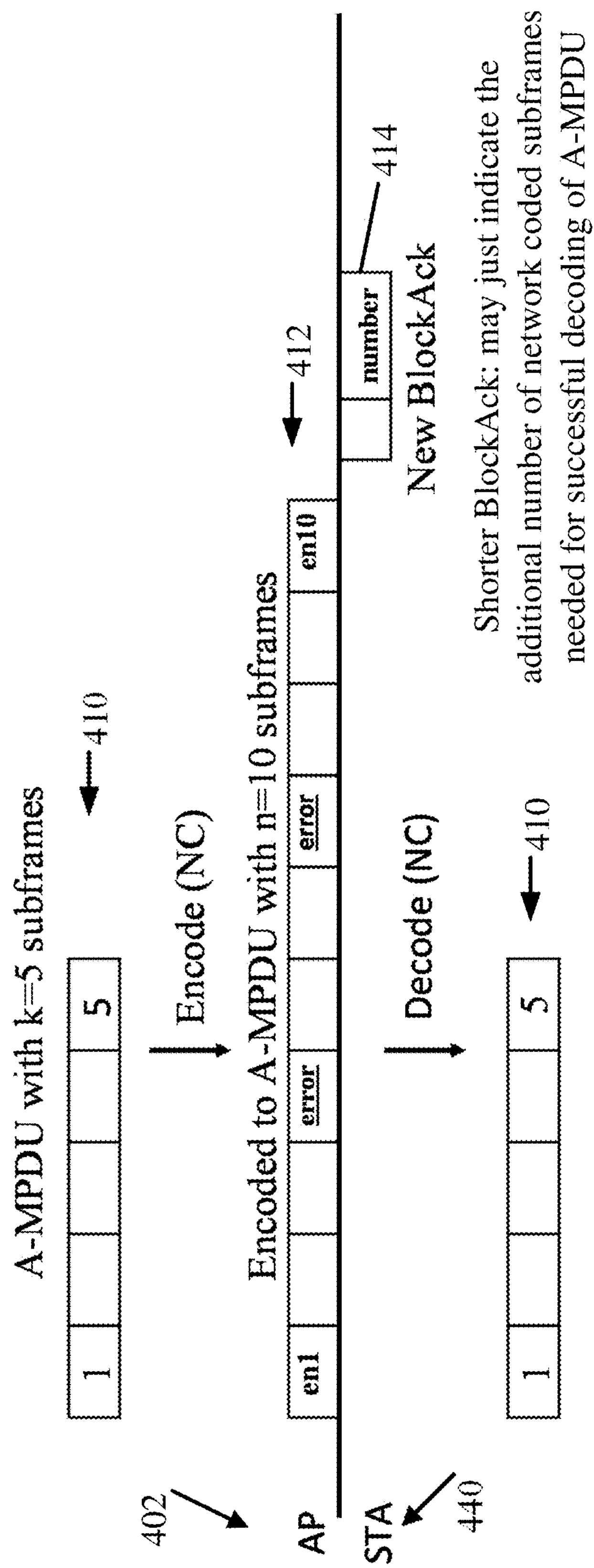
FIG. 4 is a schematic illustration of wireless communication according to an NC scheme, in accordance with some demonstrative aspects.

Reference is made to FIG. 4, which schematically illustrates wireless communication according to an NC scheme, in accordance with some demonstrative aspects.

In some demonstrative aspects, as shown in FIG. 4, a transmitter device 402, for example, an AP, may transmit a plurality of data packets to a receiver device 440, for example, a non-AP STA, according to an NC scheme, e.g., the NC scheme 300 (FIG. 3). For example, device 102 (FIG. 1) may perform one or more operations, one or more functionalities, the role of, and/or the functionality of, device 402; and/or device 140 (FIG. 1) may perform one or more operations, one or more functionalities, the role of, and/or the functionality of, device 440.

In some demonstrative aspects, transmitter device 402 may be configured to implement an A-MPDU frame structure to communicate the plurality of data packets to the receiver device 440 according to the NC scheme. For example, the A-MPDU frame structure may be implemented to aggregate multiple encoded packets as its subframes, e.g., as described below.

For example, as shown in FIG. 4, transmitter device 402 may be configured to encode an A-MPDU 410 including k=5 data subframes into an encoded A-MPDU 412 including n=10 encoded subframes. For example, transmitter device 402 may determine the n=10 encoded subframes by encoding the k=5 data subframes according to the NC scheme, e.g., as described above.

In some demonstrative aspects, as shown in FIG. 4, a subframe, e.g., each subframe, in the encoded A-MPDU 412 may be used to transmit one network encoded packet. In other aspects, a subframe in the encoded A-MPDU 412 may be used to transmit several encoded packets.

In some demonstrative aspects, as shown in FIG. 4, the receiver device 440 may be configured to transmit a BlockAck frame 414, e.g., a short BlockAck frame, which may be configured to notify the transmitter device 402 that more encoded data packets are required, for example, in case the encoded packets successfully received by the receiver device 440 are not enough for recovering the original k data packets of A-MPDU 410.

In some demonstrative aspects, the transmitter device 402 may transmit extra encoded packets, e.g. in a next A-MPDU frame, for example, based on the BlockAck frame 414, e.g., as described above.

In some demonstrative aspects, the BlockAck frame 414 may be configured to include a count value based on a count of encoded packets in encoded A-MPDU 412, which are successfully received by the receiver device 440.

In one example, the count value may be included in the BlockAck frame 414, for example, to replace one or more BlockAck bitmap fields, e.g., some or all BlockAck bitmap fields corresponding to the subframes in the encoded A-MPDU 412. For example, this configuration of the BlockAck frame 414 may provide a technical solution to support a reduced size of the BlockAck frame 414.

In some demonstrative aspects, the count value in the BlockAck frame 414 may include a collective number, which may indicate, for example, the additional number of encoded packets the receiver device 440 “wants”. For example, the count value in the BlockAck frame 414 may include the value of m, e.g., as described above.

In some demonstrative aspects, the receiver device 440 may report the number of additional packets needed for decoding in the BlockAck frame 414. For example, the receiver may be required to gather at least k encoded packets to enable decoding of the k data subframes in A-MPDU 410. For example, k-k' more packets may be required for decoding, e.g., in case after a last round of (re)transmission, a total of k'<k packets have been successfully received and decoded by the receiver device 440. Accordingly, the receiver device 440 may feedback the value of the number (k-k') in the BlockAck frame 414.

In other aspects, the count value in the BlockAck frame 414 may indicate the number of encoded packets the receiver device 440 successfully received, e.g., as described above.

Referring back to FIG. 1, in some demonstrative aspects, devices 102, 140 and/or 160 may be configured to implement one or more operations of a wireless communication technique to communicate data packets from a first wireless communication node (source) to a second wireless communication node (destination) via one or more rounds (iterations) of transmissions, e.g., as described below.

For example, device 102 (FIG. 1) may perform one or more operations, one or more functionalities, the role of, and/or the functionality of, the source device; and/or device 140 (FIG. 1) may perform one or more operations, one or more functionalities, the role of, and/or the functionality of, the destination device.

In some demonstrative aspects, the wireless communication technique may include performing at the source, network coding of a stream of packets to obtain a stream of network coded packets, e.g., as described above.

In some demonstrative aspects, the wireless communication technique may include transmitting a number of network coded packets from the source to the destination, e.g., in a first round of transmission, e.g., as described above.

In some demonstrative aspects, the wireless communication technique may include transmitting back an acknowledgement message from the destination to the source, e.g., after the first round of transmission.

In some demonstrative aspects, the acknowledgement message transmitted from the destination to the source may include a count value to indicate the number of additional network coded packets needed for decoding at the destination, e.g., as described above.

In some demonstrative aspects, the wireless communication technique may include transmitting, e.g., based on the acknowledgement message received from a last transmission round, an additional number of network coded packets from the source to the destination, e.g., in a second and each subsequent round of transmission.

In some demonstrative aspects, the wireless communication technique may include transmitting back an acknowledgement message from the destination to the source, e.g., after the second and each subsequent round of transmission.

In some demonstrative aspects, the wireless communication technique may include decoding the received network coded packets at the destination, e.g., after each round.

In some demonstrative aspects, the wireless communication technique may include stopping further transmissions of the coded packets from the source to the destination, for example, based on a determination that the total number of received packets exceeds a threshold value.

In some demonstrative aspects, the wireless communication technique may include determining the number of network coded packets transmitted in the first and/or subsequent rounds of transmissions, for example, as a function of the number of additional network coded packets needed for decoding at the destination. For example, the number of additional network coded packets needed for decoding at the destination may be indicated and/or reported in the acknowledgement message received after the previous round, e.g., as described above.

In some demonstrative aspects, the wireless communication technique may include determining the number of network coded packets transmitted in the first and/or subsequent rounds of transmissions, for example, based on a function, which may depend on the packet drop rate, e.g., as described below.

In some demonstrative aspects, the wireless communication technique may include determining the number of network coded packets transmitted in the first and/or subsequent rounds of transmissions, for example, based on a function, which may depend on the feedback overhead ratio, e.g., as described below.

In some demonstrative aspects, the wireless communication technique may include determining the number of network coded packets transmitted in the first and/or subsequent rounds of transmissions, for example, based on a predefined cost function, e.g., as described below.

In some demonstrative aspects, the predefined cost function may be configured to provide a technical solution to determine a number, e.g., an optimal number, of encoded packets to be sent in a transmission, e.g., in each transmission iterations, for example, to minimize radio resource consumption for successful data delivery, and/or to maximize spectral efficiency.

In some demonstrative aspects, the predefined cost function may be configured to provide a technical solution to determine a number, e.g., an optimal number, of encoded packets to be sent in a transmission, e.g., in each transmission iterations, for example, based on one or more criteria and/or considerations, e.g., as described below.

For example, sending too many encoded packets in the first transmission and/or in subsequent retransmissions may be unnecessary and may waste precious radio resources.

For example, sending too few encoded packets in the first transmission and/or in subsequent retransmissions may result in a reduced chance of packet recovery for each transmission, and, accordingly, more retransmissions may be needed statistically, e.g., for successful data delivery.

For example, too many retransmissions may lead to too much more feedback overhead, e.g., since each BlockAck frame may occupy some radio resources. Accordingly, too many retransmissions may lead to a decrease in the spectral efficiency.

In one example, an NC scheme may be configured with a heuristic retransmission technique, for example, by transmitting each time the exact number of m missing packets, e.g., as reported by the destination. In another example, an NC scheme may be configured, for example, according to an over-provisioning approach, e.g., by transmitting $$\frac{x}{1-e_r}$$

packets, for example, to account for a packet loss rate $e_r$. However, in many use cases and/or scenarios, these approaches may be inefficient.

In some demonstrative aspects, the predefined cost function may be configured to provide a technical solution to determine a number, e.g., an optimal number, of encoded packets to be sent in a transmission, e.g., in each transmission iterations, for example, to achieve balance, e.g., an optimal balance, between proactive and reactive redundancy, for example, to successfully deliver the data packets with the least radio resource consumption.

In some demonstrative aspects, the predefined cost function may be configured to provide a technical solution to obtain an optimal network coding retransmission scheme for an A-MPDU scenario. For example, the predefined cost function may be configured to achieve a high, e.g., best, spectral efficiency to deliver the data packets to the receiver.

In some demonstrative aspects, the predefined cost function may be configured to provide a technical solution to support improved spectral efficiency and/or reduce latency of wireless transmission. These improvements may support high reliability applications, e.g., in Wi-Fi systems and/or other technologies, and may enhance user experience.

Figure 5:
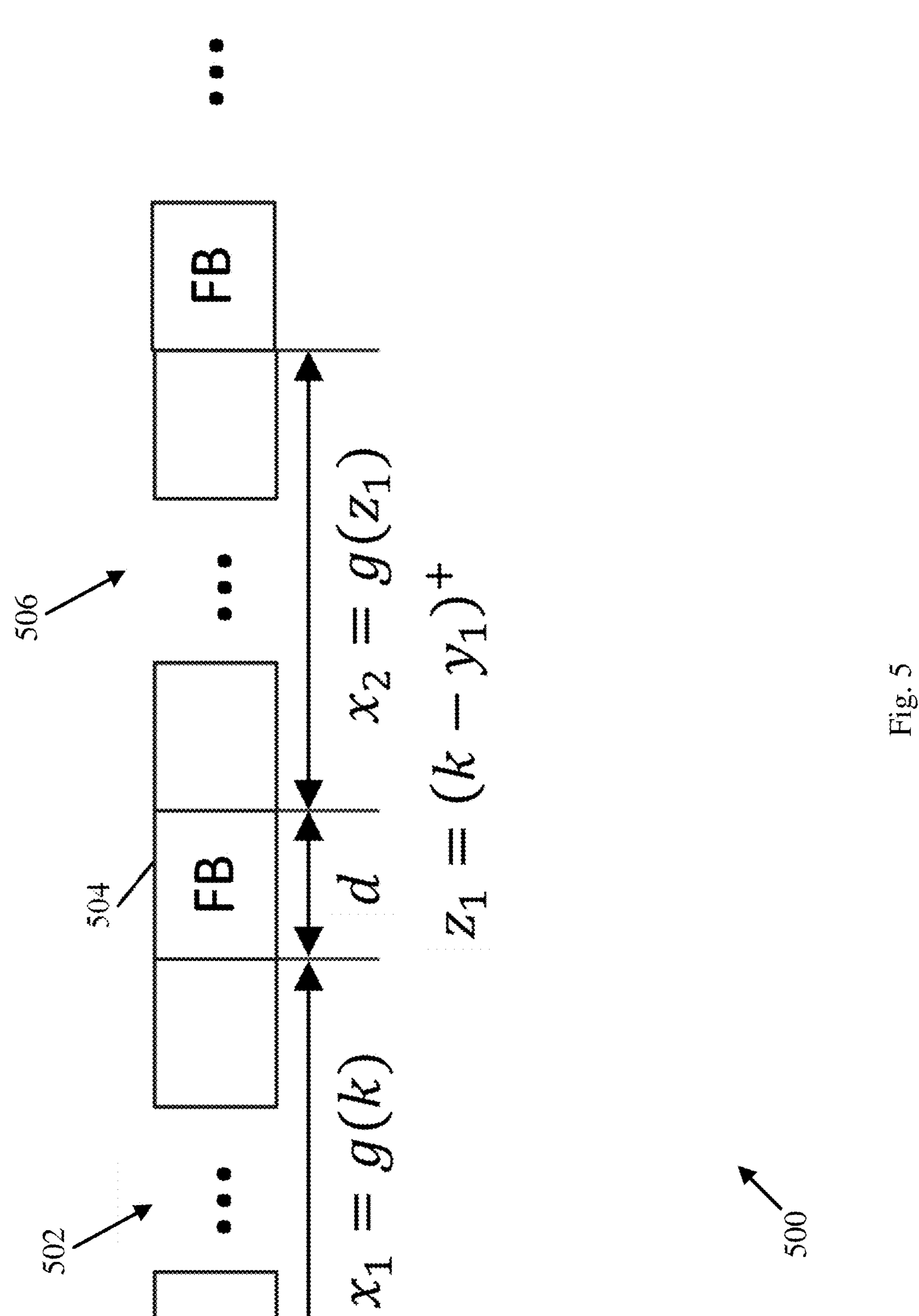
FIG. 5 is a schematic illustration of a wireless communication NC model, in accordance with some demonstrative aspects.

Reference is made to FIG. 5, which schematically illustrates a wireless communication NC model 500, in accordance with some demonstrative aspects. For example, the wireless communication NC model 500 may be utilized to model a wireless transmission technique based on NC with retransmission.

In some demonstrative aspects, as shown in FIG. 5, a transmitter may send $x_1$ encoded packets 502 to a receiver in an A-MPDU, e.g., in a first round of transmission. The $x_1$ encoded packets 502 may include encoded packets from a set of n encoded packets, which may be determined according to an NC scheme applied to a set of k data packets, e.g., as described above.

In some demonstrative aspects, $y_1$ encoded packets of the $x_1$ encoded packets 502 may be successfully received at the receiver, e.g., due to random packet drops.

In some demonstrative aspects, as shown in FIG. 5, the receiver may require, for example, $z_1=(k-y_1)^+:=\max(k-y_1, 0)$ more packets, e.g., in order to be able to properly decode the k data packets.

In some demonstrative aspects, the receiver may feedback to the transmitter a value indicative of the value $z_1$, for example, in a BlockAck, e.g., as described above.

In some demonstrative aspects, as shown in FIG. 5, the transmitter may then send a second A-MPDU 506, which includes $x_2$ encoded packets out of the n encoded packets.

In some demonstrative aspects, this procedure may continue, for example, until the receiver acknowledges in the BlockAck that decoding is successful, e.g., by indicating that "0" more packets are needed.

In some demonstrative aspects, a wireless communication technique based on NC may be configured to reduce, e.g., minimize, an expected time cost incurred during the transmissions, so that the radio resource used is minimized, e.g., assuming the time used to successfully transmit the packets is random.

In some demonstrative aspects, the expected time cost incurred during the transmissions may be based on a feedback overhead ratio 504, denoted d, which may be defined to take into account the feedback and gap time, e.g., as follows:

$$d = \frac{BlockAck\ \text{time} + \text{gap time}}{\text{transmission time of 1 packet}}$$

In some demonstrative aspects, it may be assumed that each packet is dropped according to an independent and identical probability distribution (iid), for example, with a same probability, denoted $e_r$. In this case, a wireless communication channel between the transmitter and the receiver may be stationary. For example, the transmitter may consider a time-invariant strategy g, which may depend, e.g., solely depend, on the number of missing packets $z_i$ fed back in the BlockAck. For example, it may be set that $z_0=k$, e.g., as the initial number of packets needed for decoding.

In some demonstrative aspects, e.g., without loss of generality, $x_i=g(z_i)$ may be used as a strategy function g, and an incurred time cost in the i-th transmission may be $x_i+d$, e.g., when $x_i>0$.

In some demonstrative aspects, the function g may be represented as a k-dimensional vector $(g_1, \ldots, g_k)$, where $g_j:=g(j)$ for each $j=1, 2, \ldots, k$, e.g., since these are the values that $z_i$ can take that will result in a retransmission.

In some demonstrative aspects, an optimization problem may be defined as finding the best function g to minimize the expected time resource cost, e.g., as follows:

$$\sigma_k := \mathbb{E}\left[\sum_{i=1}^{\infty} \left(X_i + d \cdot 1_{\{X_i>0\}}\right)\right] \quad (1)$$

wherein $X_i=g(Z_{i-1})$ denotes the number of packets sent at round i, $Z_i=(Z_{i-1}-Y_i)^+$ denotes the number of packets missing to enable decoding after the round i, and $Y_i$ denotes the number of packets received at round i. For example, the function $1_{\{X_i>0\}}$ may evaluate to 1 if $X_i>0$, and may take the value 0 otherwise.

In some demonstrative aspects, the optimal function $$g^* = (g_1^*, \ldots, g_k^*)$$

and/or the optimal value $$\sigma_k^*$$

may be determined, according to a recursive computation algorithm including a plurality of iterations, e.g., k iterations, as described below.

For example, for $$1 \le l \le k, \sigma_l^*$$

denotes the minimum expected time cost incurred for the transmissions, e.g., when initially l packets are needed/missing at the receiver to enable decoding.

Figure 6:
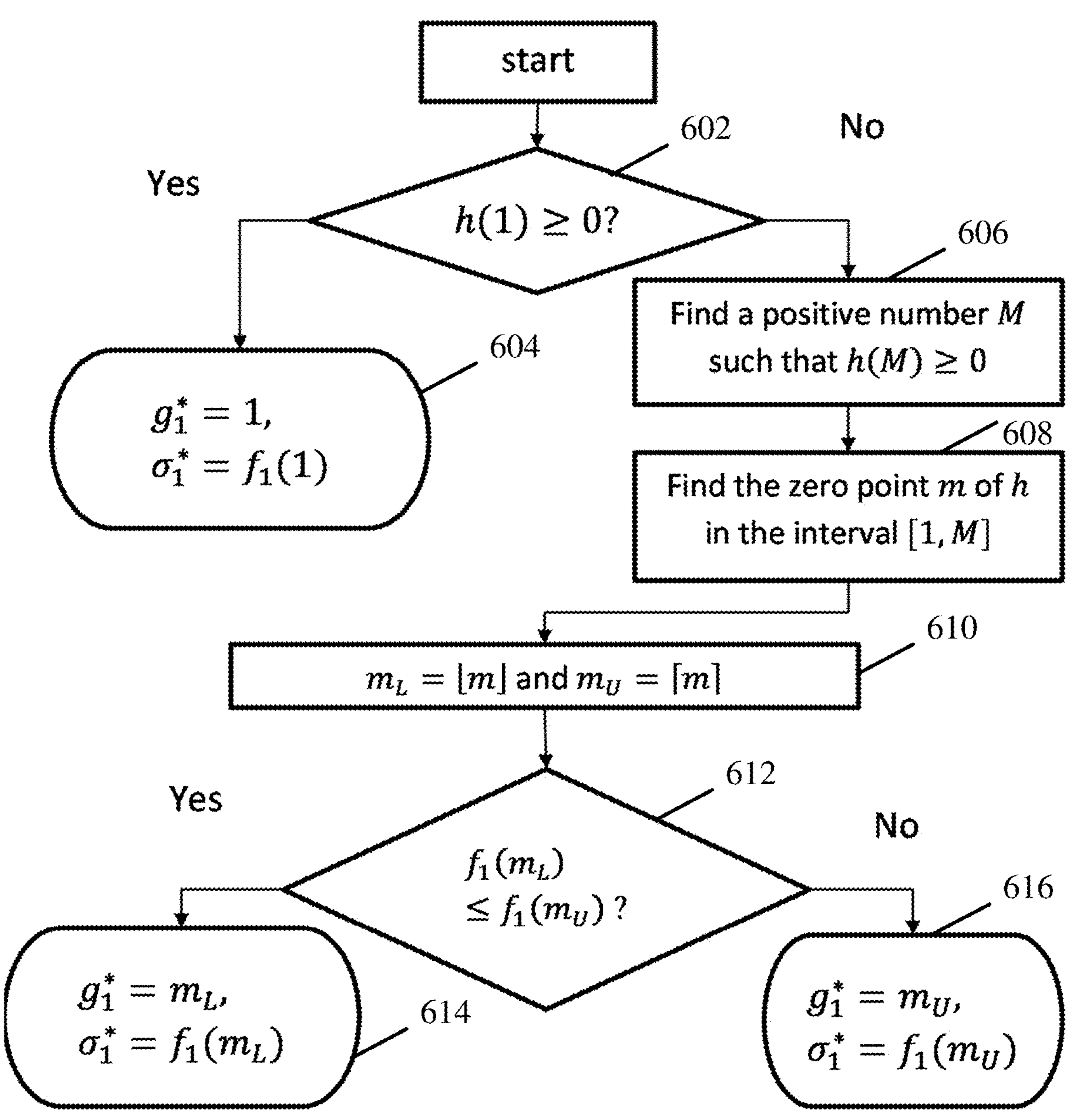
FIG. 6 is a schematic flow-chart illustration of a method of determining a function corresponding to a count of encoded packets to be transmitted according to an NC scheme, in accordance with some demonstrative aspects.

FIG. 6 is a schematic flow-chart illustration of a method of determining a function corresponding to a count of encoded packets to be transmitted according to an NC scheme, in accordance with some demonstrative aspects.

In some demonstrative aspects, one or more operations of the method of FIG. 6 may be implemented to determine the values of $$g_1^* \text{ and } \sigma_1^*,$$

e.g., in a first computation iteration of the recursive computation algorithm.

In some demonstrative aspects, the following two functions of $g_1$ may be defined:

$$f_1(g_1) = \frac{g_1 + d}{1 - e_r^{g_1}} \quad (2)$$

$$h(g_1) = 1 - e_r^{g_1}[1 - (g_1 + d) \cdot \ln e_r] \quad (3)$$

In some demonstrative aspects, $$g_1^*$$

may be computed as the point achieving the minimum of $f_1(g_1)$ among all positive integers $g_1$, and $$\sigma_1^* = f_1(g_1^*).$$

This computation may be performed by a first iteration of the method of FIG. 6.

As indicated at block 602, the method may include determining whether $h(1) \geq 0$.

As indicated at block 604, the method may include setting $$g_1^* = 1, \text{ and } \sigma_1^* = f_1(1),$$

for example, if it is determined that $h(1) \geq 0$.

As indicated at block 606, the method may include determining a positive number M such that $h(M) \geq 0$, for example, if it is determined that $h(1) < 0$.

For example, the function h may be a factor in the directive of $f_1$ that determines its sign. Accordingly, a positive number M may be found such that $h(M) \geq 0$, for example, using any suitable algorithm for searching the positive real numbers. For example, a linear search or an exponential search, e.g., by doubling the candidate number M each time, may be used.

As indicated at block 608, the method may include determining a zero point m of h in the interval [1, M].

For example, finding the zero point m of the function h (i.e., h(m)=0) in the interval [1, M] may include using any suitable root finding algorithm, e.g., bisection. It is noted that the precision of m does not need to be high, e.g., as long as the integer part of m may be determined.

As indicated at block 610, the method may include setting $m_L = \lfloor m \rfloor$ and $m_U = \lceil m \rceil$, wherein $\lfloor m \rfloor$ denotes the largest integer not exceeding m, and $\lceil m \rceil$ denotes the smallest integer larger than or equal to m.

As indicated at block 612, the method may include determining whether $f_1(m_L) \leq f_1(m_U)$.

As indicated at block 614, the method may include setting $$g_1^* = m_L, \text{ and } \sigma_1^* = f_1(m_L),$$

for example, if it is determined that $f_1(m_L) \leq f_1(m_U)$.

As indicated at block 616, the method may include setting $$g_1^* = m_U, \text{ and } \sigma_1^* = f_1(m_U),$$

for example, if it is determined that $f_1(m_L) > f_1(m_U)$.

For example, when $f_1(m_L) = f_1(m_U)$, the optimal point $$g_1^*$$

can be set based on either one of $m_L$ or $m_U$.

In some demonstrative aspects, one or more additional iterations, e.g., second and subsequent iterations, of the recursive computation algorithm may be performed, for example, to determine $$g_l^* \text{ and } \sigma_l^*$$

for $1 < l \leq k$, e.g., as described below.

In some demonstrative aspects, the following coefficient functions may be defined for the integers $x \geq 1$ and $1 \leq z \leq l$:

$$p_l(x, z) = \begin{cases} \binom{x}{l-z} e_r^{x-l+z} (1-e_r)^{l-z}, & \text{if } x \geq l-z, \\ 0, & \text{otherwise.} \end{cases}$$

For example, the function $p_l(x,z)$ may be utilized to calculate the probability of having z packets still missing to enable decoding after x new encoded packets are transmitted, e.g., if initially l packets are missing at the receiver.

For example, given $$(\sigma_1^*, \ldots, \sigma_{l-1}^*),$$

the following function may be defined:

$$f_l(g_l) = \frac{1}{1 - e_r^{g_l}} \left[ g_l + d + \sum_{z=1}^{l-1} p_l(g_l, z) \cdot \sigma_z^* \right]$$

For example, $$g_l^*$$

may be computed as the point achieving the minimum of $f_l(g_l)$, e.g., among all positive integers $g_l$, and $$\sigma_l^* = f_l(g_l^*).$$

Figure 7:
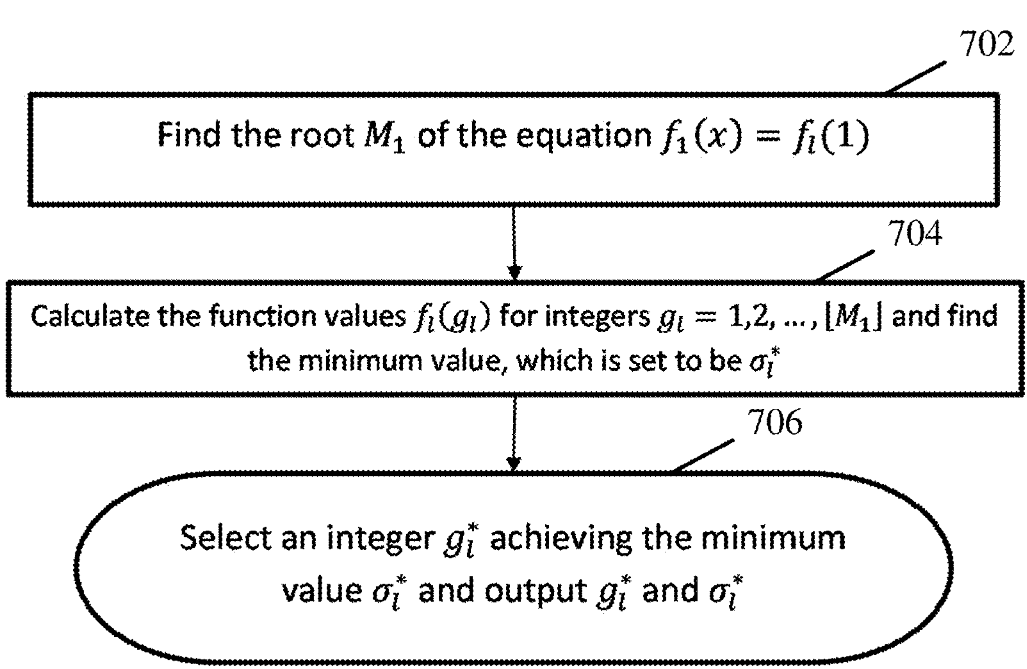
FIG. 7 is a schematic flow-chart illustration of a method of determining a function corresponding to a count of encoded packets to be transmitted according to an NC scheme, in accordance with some demonstrative aspects.

FIG. 7 is a schematic flow-chart illustration of a method of determining a function corresponding to a count of encoded packets to be transmitted according to an NC scheme, in accordance with some demonstrative aspects.

In some demonstrative aspects, one or more operations of the method of FIG. 7 may be implemented to determine $g_l$ and $$\sigma_l^*,$$

e.g., in the l-th computation iteration of the recursive computation algorithm.

As indicated at block 702, the method may include determining the root $M_1$ of the equation $f_1(x) = f_l(1)$.

For example, finding the root $M_1$ of the equation $f_1(x) = f_l(1)$ may include searching for a positive number $x_1$ such that $f_1(x_1) > f_l(1)$. For example, the number $x_1$ may be found using any suitable algorithm for searching the positive real numbers. For example, a linear search or an exponential search, e.g., by doubling the candidate number $x_1$ each time, may be used.

For example, finding the root $M_1$ of the equation $f_1(x) = f_l(1)$ may include finding the root of the equation in the interval $[m, x_1]$, where m is defined in the first iteration. For example, finding the root of the equation in the interval $[m, x_1]$ may include using any suitable root finding algorithm, e.g., bisection.

As indicated at block 704, the method may include determining function values $f_l(g_l)$ for integers $g_l = 1, 2, \ldots, \lfloor M_1 \rfloor$, and finding the minimum value, which is set to be $$\sigma_l^*.$$

As indicated at block 706, the method may include selecting an integer $$g_l^*$$

achieving the minimum value $$\sigma_l^*,$$

and setting $$g_l^* \text{ and } \sigma_l^*.$$

For example, in some cases, there may be more than one integer achieving the minimum value $$\sigma_l^*.$$

In such cases, the optimal point $$g_l^*$$

may be set as any integer achieving $$\sigma_l^*.$$

Figure 8:
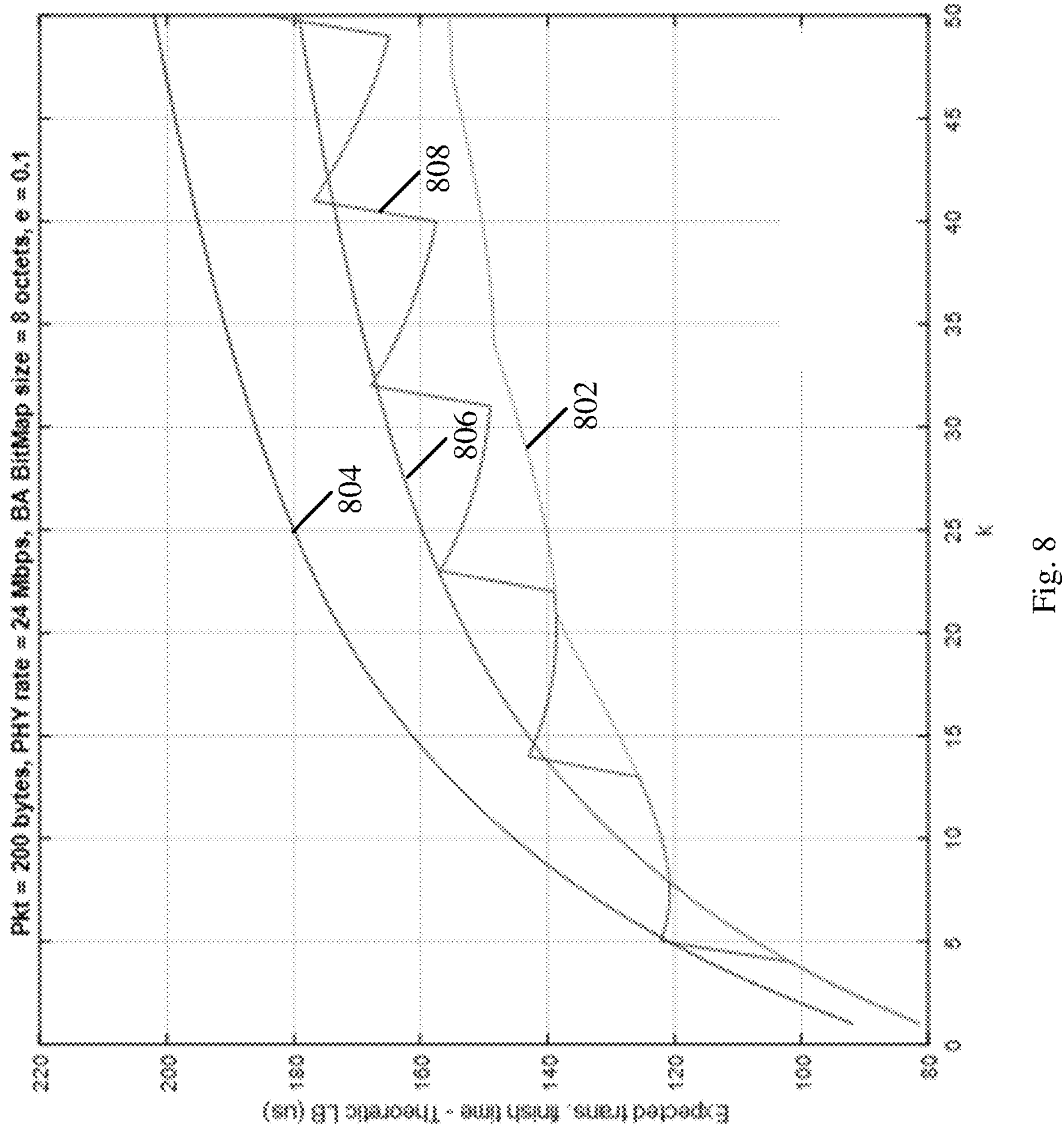
FIG. 8 is a schematic illustration of a graph depicting a plurality of curves representing expected transmission time versus data packet count corresponding to a plurality of wireless communication schemes, in accordance with some demonstrative aspects.

FIG. 8 is a schematic illustration of a graph depicting a plurality of curves representing expected transmission time versus data packet count corresponding to a plurality of wireless communication schemes, in accordance with some demonstrative aspects.

For example, as shown in FIG. 8, a curve 802 may represent simulated expected time costs for delivering k data packets using a wireless communication technique based on NC, e.g., as described above with reference to FIGS. 2-7.

For example, as shown in FIG. 8, a curve 804 may represent simulated expected time costs for delivering k data packets using a selective retransmission scheme.

For example, as shown in FIG. 8, a curve 806 may represent simulated expected time costs for delivering k data packets using a heuristic network coding retransmission scheme based on transmitting the exact number x of missing packets, e.g., by setting g(l)=l for 1≤l≤k.

For example, as shown in FIG. 8, a curve 808 may represent simulated expected time costs for delivering k data packets using a heuristic network coding retransmission scheme based on over-provisioning to account for a packet loss rate $e_r$, e.g., by setting $$g(l) = \text{round}\left(\frac{l}{1-e_r}\right).$$

In some demonstrative aspects, the curves 802, 804, 806 and 808 may represent simulation results corresponding to a packet loss rate $e_r$=0.1, a packet size of 200 bytes, and a data rate (PHY rate) of 24 Mbps for transmitting the packets. For example, the curves 804, 806 and 808 may be based on using 8 octets for the bitmap in a BlockAck for selective retransmission. For example, the curve 802 may be based on a BlockAck using 1 octet for reporting the number of missing packets to enable decoding.

For example, the curves 802, 804, 806 and 808 may represent simulation results of adjusted expected time costs for different values of the number of packets k. For example, the expected times are offset by a theoretic lower bound $$\frac{1}{1-e_r} \cdot k \cdot (\text{single packet transmission time}),$$

which ignores the feedback time cost.

In some demonstrative aspects, as shown in FIG. 8, the wireless communication technique based on NC, e.g., as described above with reference to FIGS. 2-7, provides superior performance results (curve 802), e.g., using the least amount of time resource to deliver the packets.

Reference is made to FIG. 9, which schematically illustrates a method of wireless communication based on an NC scheme, in accordance with some demonstrative aspects. For example, one or more of the operations of the method of FIG. 5 may be performed by one or more elements of a system, e.g., system 100 (FIG. 1), for example, one or more wireless devices, e.g., device 102 (FIG. 1), device 140 (FIG. 1), and/or device 160 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 902, the method may include encoding at a wireless communication device k data packets into n encoded packets according to an NC scheme, wherein k is equal to or greater than two, and wherein n is greater than k. For example, controller 124 (FIG. 1) may be configured to cause, trigger, and/or control device 102 (FIG. 1) to encode the k data packets into the n encoded packets according to the NC scheme, e.g., as described above.

As indicated at block 904, the method may include determining a count of x encoded packets out of the n encoded packets, for example, based on a count of m required packets and based on a parameter corresponding to a link condition of a wireless communication link between the wireless communication device and a receiver device. For example, a value of m may be based on a difference between k and a total count of successfully received encoded packets, which are successfully received by the receiver device. For example, controller 124 (FIG. 1) may be configured to cause, trigger, and/or control device 102 (FIG. 1) to determine the value of x, e.g., as described above.

As indicated at block 906, the method may include transmitting the x encoded packets over the wireless communication link. For example, controller 124 (FIG. 1) may be configured to cause, trigger, and/or control device 102 (FIG. 1) to transmit the x encoded packets over the wireless communication link, e.g., as described above.

Figure 10:
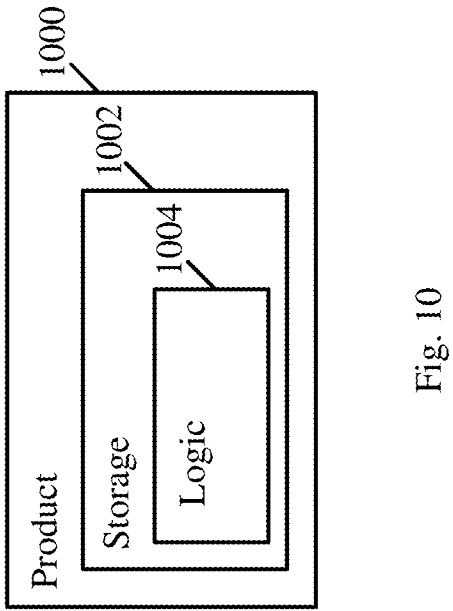
FIG. 10 is a schematic illustration of a product of manufacture, in accordance with some demonstrative aspects.

Reference is made to FIG. 10, which schematically illustrates a product of manufacture 1000, in accordance with some demonstrative aspects. Product 1000 may include one or more tangible computer-readable ("machine-readable") non-transitory storage media 1002, which may include computer-executable instructions, e.g., implemented by logic 1004, operable to, when executed by at least one computer processor, enable the at least one computer processor to implement one or more operations at device 102 (FIG. 1), device 140 (FIG. 1), device 160 (FIG. 1), controller 124 (FIG. 1), controller 154 (FIG. 1), message processor 128 (FIG. 1), message processor 158 (FIG. 1), radio 114 (FIG. 1), radio 144 (FIG. 1), transmitter 118 (FIG. 1), transmitter 148 (FIG. 1), receiver 116 (FIG. 1), and/or receiver 146 (FIG. 1); to cause device 102 (FIG. 1), device 140 (FIG. 1), device 160 (FIG. 1), controller 124 (FIG. 1), controller 154 (FIG. 1), message processor 128 (FIG. 1), message processor 158 (FIG. 1), radio 114 (FIG. 1), radio 144 (FIG. 1), transmitter 118 (FIG. 1), transmitter 148 (FIG. 1), receiver 116 (FIG. 1), and/or receiver 146 (FIG. 1) to perform, trigger and/or implement one or more operations and/or functionalities; and/or to perform, trigger and/or implement one or more operations and/or functionalities described with reference to the FIGS. 1-9, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1000 and/or machine readable storage media 1002 may include one or more types of computer-readable storage media capable of storing data, including volatile memory, non-volatile memory, removable or non-removable memory, erasable or non-erasable memory, writeable or re-writeable memory, and the like. For example, machine readable storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a hard drive, an optical disk, a magnetic disk, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and circuitry configured to cause a wireless communication device to encode k data packets into n encoded packets according to a Network Coding (NC) scheme, wherein k is equal to or greater than two, and wherein n is greater than k; determine a count of x encoded packets out of the n encoded packets based on a count of m required packets and based on a parameter corresponding to a link condition of a wireless communication link between the wireless communication device and a receiver device, wherein a value of m is based on a difference between k and a total count of successfully received encoded packets, which are successfully received by the receiver device; and transmit the x encoded packets over the wireless communication link.

Example 2 includes the subject matter of Example 1, and optionally, wherein the apparatus is configured to cause the wireless communication device to perform one or more transmission iterations, wherein an i-th transmission iteration comprises:

determining a count of $x(i)$ encoded packets out of the n encoded packets based on a count of $m(i)$ required packets and based on the parameter corresponding to the link condition, wherein a value of $m(i)$ is based on a difference between k and a total count of successfully received encoded packets prior to the i-th iteration; and transmitting the $x(i)$ encoded packets over the wireless communication link.

Example 3 includes the subject matter of Example 2, and optionally, wherein the apparatus is configured to cause the wireless communication device to determine the value of $m(i)$ based on a count value in an Acknowledgment (ACK) from the receiver device, the ACK is based on an $(i-1)$-th transmission iteration.

Example 4 includes the subject matter of Example 3, and optionally, wherein the count value in the ACK comprises the value of $m(i)$.

Example 5 includes the subject matter of Example 3, and optionally, wherein the count value in the ACK comprises a count of successfully received encoded packets in the $(i-1)$-th transmission iteration.

Example 6 includes the subject matter of any one of Examples 2-5, and optionally, wherein the apparatus is configured to cause the wireless communication device to continue to perform the transmission iterations until the value of $m(i)$ meets a predefined threshold.

Example 7 includes the subject matter of any one of Examples 2-6, and optionally, wherein the apparatus is configured to cause the wireless communication device to continue to perform the transmission iterations until $m(i)=0$.

Example 8 includes the subject matter of any one of Examples 2-7, and optionally, wherein the apparatus is configured to cause the wireless communication device to set $m(1)=k$.

Example 9 includes the subject matter of any one of Examples 1-8, and optionally, wherein the apparatus is configured to cause the wireless communication device to determine a value of x based on a parameter corresponding to an Acknowledge (ACK) time to acknowledge successful receipt of packets at the receiver device.

Example 10 includes the subject matter of any one of Examples 1-9, and optionally, wherein the apparatus is configured to cause the wireless communication device to determine a value of x based on a feedback overhead ratio, wherein the feedback overhead ratio is based on a duration of an Acknowledge (ACK) from the receiver device, a gap time between the ACK and transmission of the x encoded packets, and a transmission time of an encoded packet subsequent to the ACK.

Example 11 includes the subject matter of any one of Examples 1-10, and optionally, wherein the apparatus is configured to cause the wireless communication device to calculate a value of x based on a predefined cost function applied to the value of m and the parameter corresponding to the link condition.

Example 12 includes the subject matter of any one of Examples 1-10, and optionally, wherein the apparatus is configured to cause the wireless communication device to retrieve a value of x from a predefined Look-Up-Table (LUT) based on the value of m and the parameter corresponding to the link condition.

Example 13 includes the subject matter of any one of Examples 1-12, and optionally, wherein the apparatus is configured to cause the wireless communication device to determine the value of m based on a count value in an Acknowledgment (ACK) from the receiver device, the ACK is based on a previous transmission of encoded packets out of the n encoded packets.

Example 14 includes the subject matter of Example 13, and optionally, wherein the count value in the ACK comprises the value of m.

Example 15 includes the subject matter of Example 13, and optionally, wherein the count value in the ACK comprises a count of successfully received packets in the previous transmission.

Example 16 includes the subject matter of any one of Examples 1-15, and optionally, wherein the parameter corresponding to the link condition is based on a packet drop rate over the wireless communication link.

Example 17 includes the subject matter of any one of Examples 1-16, and optionally, wherein the apparatus is configured to cause the wireless communication device to transmit an Aggregate Medium Access Control Protocol Data Unit (A-MPDU) comprising the x encoded packets.

Example 18 includes the subject matter of any one of Examples 1-17, and optionally, wherein the NC coding scheme is configured such that the k data packets are decodable from a group of encoded packets including at least k encoded packets of the n encoded packets.

Example 19 includes the subject matter of any one of Examples 1-18, and optionally, wherein the NC coding scheme is configured such that the k data packets are decodable from any group of p encoded packets, wherein p is a predefined value equal to or greater than k.

Example 20 includes the subject matter of any one of Examples 1-19, and optionally, wherein the NC coding scheme is configured such that the k data packets are decodable from any group of k encoded packets.

Example 21 includes the subject matter of any one of Examples 1-20, and optionally, wherein the k data packets comprise time-sensitive data packets.

Example 22 includes the subject matter of any one of Examples 1-21, and optionally, comprising at least one radio to transmit the x encoded packets.

Example 23 includes the subject matter of Example 22, and optionally, comprising one or more antennas connected to the radio, and a processor to execute instructions of an operating system of the wireless communication device.

Example 24 comprises a wireless communication device comprising the apparatus of any of Examples 1-23.

Example 25 comprises an apparatus comprising means for executing any of the described operations of any of Examples 1-23.

Example 26 comprises a product comprising one or more tangible computer-readable non-transitory storage media comprising computer-executable instructions operable to, when executed by at least one processor, enable the at least one processor to cause a wireless communication device to perform any of the described operations of any of Examples 1-23.

Example 26 comprises an apparatus comprising: a memory interface; and processing circuitry configured to: perform any of the described operations of any of Examples 1-23.

Example 27 comprises a method comprising any of the described operations of any of Examples 1-23.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless communication device to:

encode k data packets into n encoded packets according to a Network Coding (NC) scheme, wherein k is equal to or greater than two, and wherein n is greater than k;

determine a count of x encoded packets out of the n encoded packets based on a count of m required packets and based on a parameter corresponding to a link condition of a wireless communication link between the wireless communication device and a receiver device, wherein a value of m is based on a difference between k and a total count of successfully received encoded packets, which are successfully received by the receiver device; and transmit the x encoded packets over the wireless communication link.

2. The apparatus of claim 1 configured to cause the wireless communication device to perform one or more transmission iterations, wherein an i-th transmission iteration comprises:

determining a count of x(i) encoded packets out of the n encoded packets based on a count of m(i) required packets and based on the parameter corresponding to the link condition, wherein a value of m(i) is based on a difference between k and a total count of successfully received encoded packets prior to the i-th iteration; and transmitting the x(i) encoded packets over the wireless communication link.

3. The apparatus of claim 2 configured to cause the wireless communication device to determine the value of m(i) based on a count value in an Acknowledgment (ACK) from the receiver device, the ACK is based on an (i−1)-th transmission iteration.

4. The apparatus of claim 2 configured to cause the wireless communication device to continue to perform the transmission iterations until the value of m(i) meets a predefined threshold.

5. The apparatus of claim 2 configured to cause the wireless communication device to continue to perform the transmission iterations until m(i)=0.

6. The apparatus of claim 2 configured to cause the wireless communication device to set m(1)=k.

7. The apparatus of claim 1 configured to cause the wireless communication device to determine a value of x based on a parameter corresponding to an Acknowledge (ACK) time to acknowledge successful receipt of packets at the receiver device.

8. The apparatus of claim 1 configured to cause the wireless communication device to determine a value of x based on a feedback overhead ratio, wherein the feedback overhead ratio is based on a duration of an Acknowledge (ACK) from the receiver device, a gap time between the ACK and transmission of the x encoded packets, and a transmission time of an encoded packet subsequent to the ACK.

9. The apparatus of claim 1 configured to cause the wireless communication device to calculate a value of x based on a predefined cost function applied to the value of m and the parameter corresponding to the link condition.

10. The apparatus of claim 1 configured to cause the wireless communication device to retrieve a value of x from a predefined Look-Up-Table (LUT) based on the value of m and the parameter corresponding to the link condition.

11. The apparatus of claim 1 configured to cause the wireless communication device to determine the value of m based on a count value in an Acknowledgment (ACK) from the receiver device, the ACK is based on a previous transmission of encoded packets out of the n encoded packets.

12. The apparatus of claim 11, wherein the count value in the ACK comprises the value of m.

13. The apparatus of claim 12, wherein the count value in the ACK comprises a count of successfully received packets in the previous transmission.

14. The apparatus of claim 1, wherein the parameter corresponding to the link condition is based on a packet drop rate over the wireless communication link.

15. The apparatus of claim 1 configured to cause the wireless communication device to transmit an Aggregate Medium Access Control Protocol Data Unit (A-MPDU) comprising the x encoded packets.

16. The apparatus of claim 1, wherein the NC coding scheme is configured such that the k data packets are decodable from a group of encoded packets including at least k encoded packets of the n encoded packets.

17. The apparatus of claim 1, wherein the NC coding scheme is configured such that the k data packets are decodable from any group of p encoded packets, wherein p is a predefined value equal to or greater than k.

18. The apparatus of claim 1, wherein the NC coding scheme is configured such that the k data packets are decodable from any group of k encoded packets.

19. The apparatus of claim 1, wherein the k data packets comprise time-sensitive data packets.

20. The apparatus of claim 1 comprising at least one radio to transmit the x encoded packets.

21. The apparatus of claim 20 comprising one or more antennas connected to the radio, and a processor to execute instructions of an operating system of the wireless communication device.

22. A product comprising one or more tangible computer-readable non-transitory storage media comprising computer-executable instructions operable to, when executed by at least one processor, enable the at least one processor to cause a wireless communication device to:

encode k data packets into n encoded packets according to a Network Coding (NC) scheme, wherein k is equal to or greater than two, and wherein n is greater than k;

determine a count of x encoded packets out of the n encoded packets based on a count of m required packets and based on a parameter corresponding to a link condition of a wireless communication link between the wireless communication device and a receiver device, wherein a value of m is based on a difference between k and a total count of successfully received encoded packets, which are successfully received by the receiver device; and transmit the x encoded packets over the wireless communication link.

23. The product of claim 22, wherein the instructions, when executed, cause the wireless communication device to perform one or more transmission iterations, wherein an i-th transmission iteration comprises:

determining a count of x(i) encoded packets out of the n encoded packets based on a count of m(i) required packets and based on the parameter corresponding to the link condition, wherein a value of m(i) is based on a difference between k and a total count of successfully received encoded packets prior to the i-th iteration; and transmitting the x(i) encoded packets over the wireless communication link.

24. An apparatus for a wireless communication device, the apparatus comprising:

means for encoding k data packets into n encoded packets according to a Network Coding (NC) scheme, wherein k is equal to or greater than two, and wherein n is greater than k;

means for determining a count of x encoded packets out of the n encoded packets based on a count of m required packets and based on a parameter corresponding to a link condition of a wireless communication link between the wireless communication device and a receiver device, wherein a value of m is based on a difference between k and a total count of successfully received encoded packets, which are successfully received by the receiver device; and means for causing the wireless communication device to transmit the x encoded packets over the wireless communication link.

25. The apparatus of claim 24, wherein the means for determining the count of x encoded packets is configured for determining a value of x based on a parameter corresponding to an Acknowledge (ACK) time to acknowledge successful receipt of packets at the receiver device.

* * * * *